US012621268B2

(12) United States Patent
Chanak et al.

(10) Patent No.: US 12,621,268 B2
(45) Date of Patent: *May 5, 2026

(54) ZERO TRUST PRIVATE APPLICATION ACCESS VIA SOCIAL MEDIA BASED VALIDATION FOR GOVERNMENT APPLICATIONS

(71) Applicant: Zscaler, Inc., San Jose, CA (US)

(72) Inventors: John A. Chanak, Saratoga, CA (US); William Fehring, Sunnyvale, CA (US); Richard Miles, Sunnyvale, CA (US); Shujaat Jaffrey, Bengaluru (IN); Jose Padin, Washington, DC (US); Matthew Moulton, Washington, DC (US)

(73) Assignee: Zscaler, Inc., San Jose, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 18/160,444

(22) Filed: Jan. 27, 2023

(65) Prior Publication Data

US 2023/0247003 A1 Aug. 3, 2023

Related U.S. Application Data

(63) Continuation-in-part of application No. 16/800,307, filed on Feb. 25, 2020, now Pat. No. 11,652,797.

(Continued)

(51) Int. Cl.
*H04L 9/40* (2022.01)
*G06F 9/54* (2006.01)
(Continued)

(52) U.S. Cl.
CPC .......... *H04L 63/0272* (2013.01); *G06F 9/547* (2013.01); *H04L 9/006* (2013.01);
(Continued)

(58) Field of Classification Search
CPC ... H04L 63/0272; H04L 9/006; H04L 9/0894; H04L 9/14; H04L 9/30; H04L 9/3263;
(Continued)

(56) References Cited

U.S. PATENT DOCUMENTS 6,636,923 B1 10/2003 Meirsman et al.
8,205,246 B2 * 6/2012 Shatzkamer ........ H04L 63/0892
713/153

(Continued)

FOREIGN PATENT DOCUMENTS

WO WO-03060842 A1 * 7/2003 ............. G07F 9/026

OTHER PUBLICATIONS

J. R. Vic Winkler, "Securing the Cloud: Cloud Computer Security Techniques and Tactics", May 2011, Syngress Publishing, Full Text.

(Continued)

*Primary Examiner* — Bryan F Wright
(74) *Attorney, Agent, or Firm* — Baratta Law PLLC; Lawrence A. Baratta, Jr.; Ryan Odessa

(57) ABSTRACT

Systems and methods include, receiving a request from a user to access an application; determining if the user meets one or more requirements, wherein responsive to the user meeting the one or more requirements, presenting the user with a login page; validating credentials of the user with one or more additional sources; responsive to successful validation of the users' credentials, authenticating the user and evaluating one or more access policies for the user; and initiating a connection between the user and the application based on the one or more access policies.

20 Claims, 30 Drawing Sheets

Related U.S. Application Data which is a continuation of application No. 15/986,874, filed on May 23, 2018, now Pat. No. 10,616,180, which is a continuation-in-part of application No. 15/158,153, filed on May 18, 2016, now Pat. No. 10,375,024, which is a continuation-in-part of application No. 14/310,348, filed on Jun. 20, 2014, now Pat. No. 9,350,710.

(51) Int. Cl.

| | |
|---|---|
| *H04L 9/00* | (2022.01) |
| *H04L 9/08* | (2006.01) |
| *H04L 9/14* | (2006.01) |
| *H04L 9/30* | (2006.01) |
| *H04L 9/32* | (2006.01) |
| *H04L 67/01* | (2022.01) |
| *H04L 67/1021* | (2022.01) |
| *H04L 61/4511* | (2022.01) |
| *H04L 61/59* | (2022.01) |

(52) U.S. Cl.
CPC .............. *H04L 9/0894* (2013.01); *H04L 9/14* (2013.01); *H04L 9/30* (2013.01); *H04L 9/3263* (2013.01); *H04L 63/029* (2013.01); *H04L 63/0823* (2013.01); *H04L 63/0876* (2013.01); *H04L 67/01* (2022.05); *H04L 67/1021* (2013.01); *H04L 61/4511* (2022.05); *H04L 61/59* (2022.05)

(58) Field of Classification Search
CPC ............... H04L 63/029; H04L 63/0823; H04L 63/0876; H04L 67/01; H04L 67/1021; H04L 61/4511; H04L 61/59; H04L 9/3226; H04L 63/08; H04L 63/10; H04L 63/20; G06F 9/547
USPC ........................................................ 713/156
See application file for complete search history.

(56) References Cited

U.S. PATENT DOCUMENTS

| | | | |
|---|---|---|---|
| 8,869,259 | B1 | 10/2014 | Udupa et al. |
| 10,742,659 | B1 * | 8/2020 | Roka ................... H04L 63/0884 |
| 2006/0074618 | A1 | 4/2006 | Miller et al. |
| 2007/0042756 | A1 | 2/2007 | Perfetto et al. |
| 2008/0307519 | A1 | 12/2008 | Curcio |
| 2009/0129271 | A1 | 5/2009 | Ramankutty et al. |
| 2011/0296486 | A1 | 12/2011 | Burch et al. |
| 2011/0310899 | A1 | 12/2011 | Alkhatib et al. |
| 2012/0023325 | A1 | 1/2012 | Lai |
| 2012/0185913 | A1 | 7/2012 | Martinez et al. |
| 2012/0281708 | A1 | 11/2012 | Chauhan et al. |
| 2013/0347072 | A1 | 12/2013 | Dinha |
| 2014/0022586 | A1 | 1/2014 | Zehler |
| 2014/0282817 | A1 | 9/2014 | Singer et al. |
| 2020/0252400 | A1 * | 8/2020 | Pike ........................ G06F 21/42 |
| 2022/0021711 | A1 * | 1/2022 | Marsh ................... H04L 9/3247 |

OTHER PUBLICATIONS

Stephen R. Smoot, "Private Cloud Computing: Consolidation, Virtualization, and Service-Oriented Infrastructure", Oct. 2011, Morgan Kaufman Publishers, Inc. Full Text.

* cited by examiner

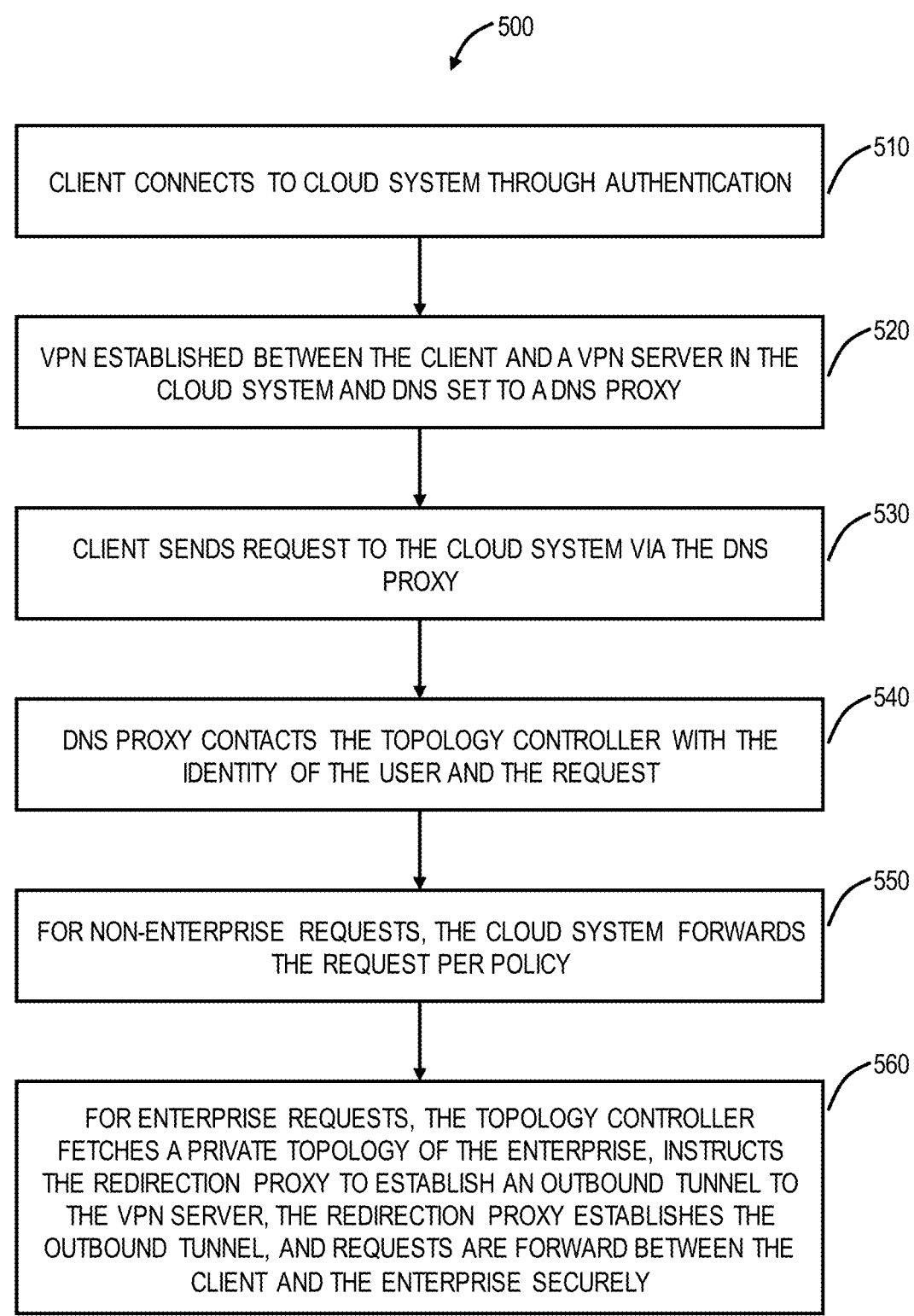

500

510
CLIENT CONNECTS TO CLOUD SYSTEM THROUGH AUTHENTICATION

520
VPN ESTABLISHED BETWEEN THE CLIENT AND A VPN SERVER IN THE CLOUD SYSTEM AND DNS SET TO A DNS PROXY

530
CLIENT SENDS REQUEST TO THE CLOUD SYSTEM VIA THE DNS PROXY

540
DNS PROXY CONTACTS THE TOPOLOGY CONTROLLER WITH THE IDENTITY OF THE USER AND THE REQUEST

550
FOR NON-ENTERPRISE REQUESTS, THE CLOUD SYSTEM FORWARDS THE REQUEST PER POLICY

560
FOR ENTERPRISE REQUESTS, THE TOPOLOGY CONTROLLER FETCHES A PRIVATE TOPOLOGY OF THE ENTERPRISE, INSTRUCTS THE REDIRECTION PROXY TO ESTABLISH AN OUTBOUND TUNNEL TO THE VPN SERVER, THE REDIRECTION PROXY ESTABLISHES THE OUTBOUND TUNNEL, AND REQUESTS ARE FORWARD BETWEEN THE CLIENT AND THE ENTERPRISE SECURELY

FIG. 8

REMOTE USERS, CONTRACTORS, PARTNERS

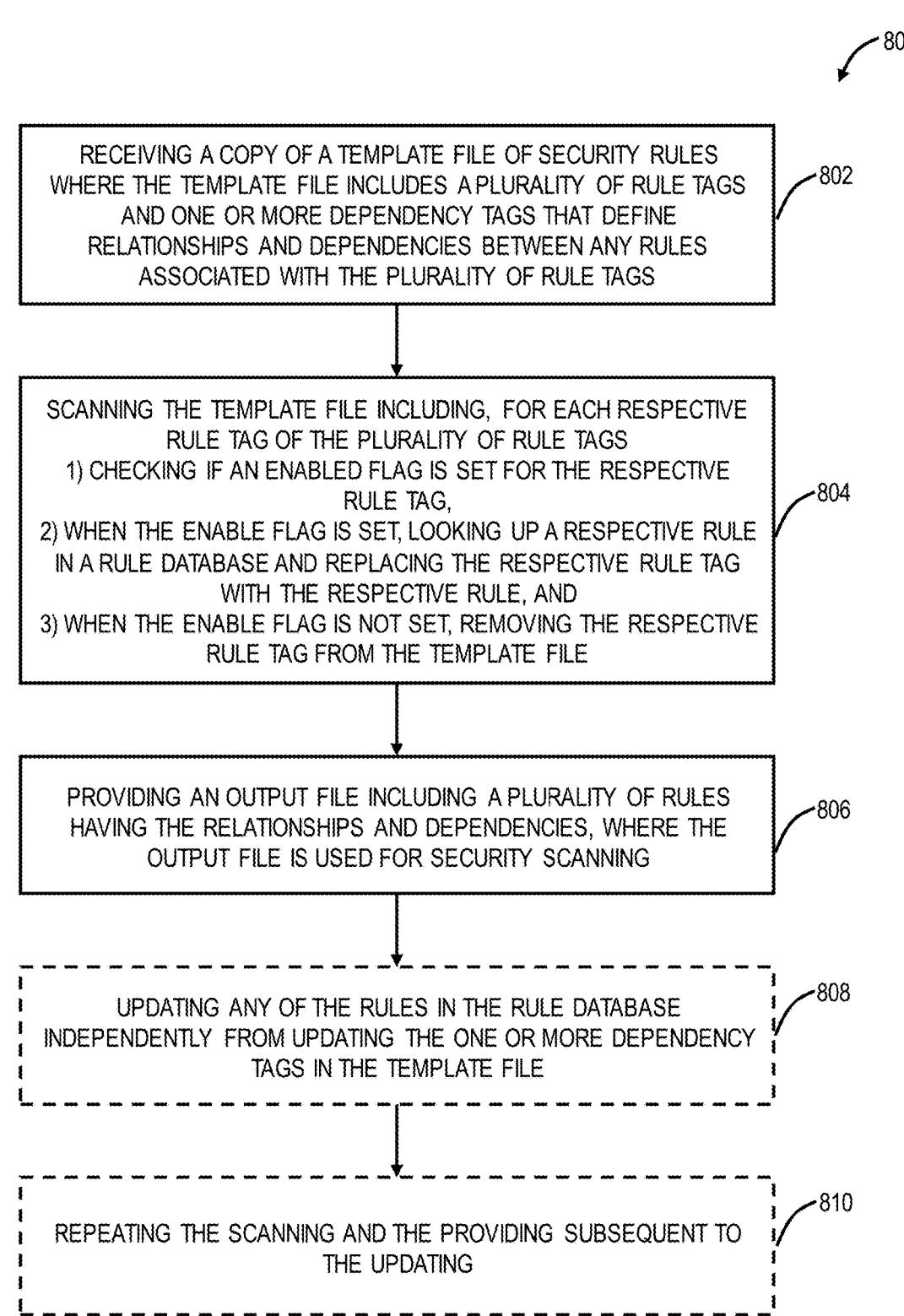

800

RECEIVING A COPY OF A TEMPLATE FILE OF SECURITY RULES WHERE THE TEMPLATE FILE INCLUDES A PLURALITY OF RULE TAGS AND ONE OR MORE DEPENDENCY TAGS THAT DEFINE RELATIONSHIPS AND DEPENDENCIES BETWEEN ANY RULES ASSOCIATED WITH THE PLURALITY OF RULE TAGS

802

SCANNING THE TEMPLATE FILE INCLUDING, FOR EACH RESPECTIVE RULE TAG OF THE PLURALITY OF RULE TAGS
1) CHECKING IF AN ENABLED FLAG IS SET FOR THE RESPECTIVE RULE TAG,
2) WHEN THE ENABLE FLAG IS SET, LOOKING UP A RESPECTIVE RULE IN A RULE DATABASE AND REPLACING THE RESPECTIVE RULE TAG WITH THE RESPECTIVE RULE, AND
3) WHEN THE ENABLE FLAG IS NOT SET, REMOVING THE RESPECTIVE RULE TAG FROM THE TEMPLATE FILE

804

PROVIDING AN OUTPUT FILE INCLUDING A PLURALITY OF RULES HAVING THE RELATIONSHIPS AND DEPENDENCES, WHERE THE OUTPUT FILE IS USED FOR SECURITY SCANNING

806

UPDATING ANY OF THE RULES IN THE RULE DATABASE INDEPENDENTLY FROM UPDATING THE ONE OR MORE DEPENDENCY TAGS IN THE TEMPLATE FILE

808

REPEATING THE SCANNING AND THE PROVIDING SUBSEQUENT TO THE UPDATING

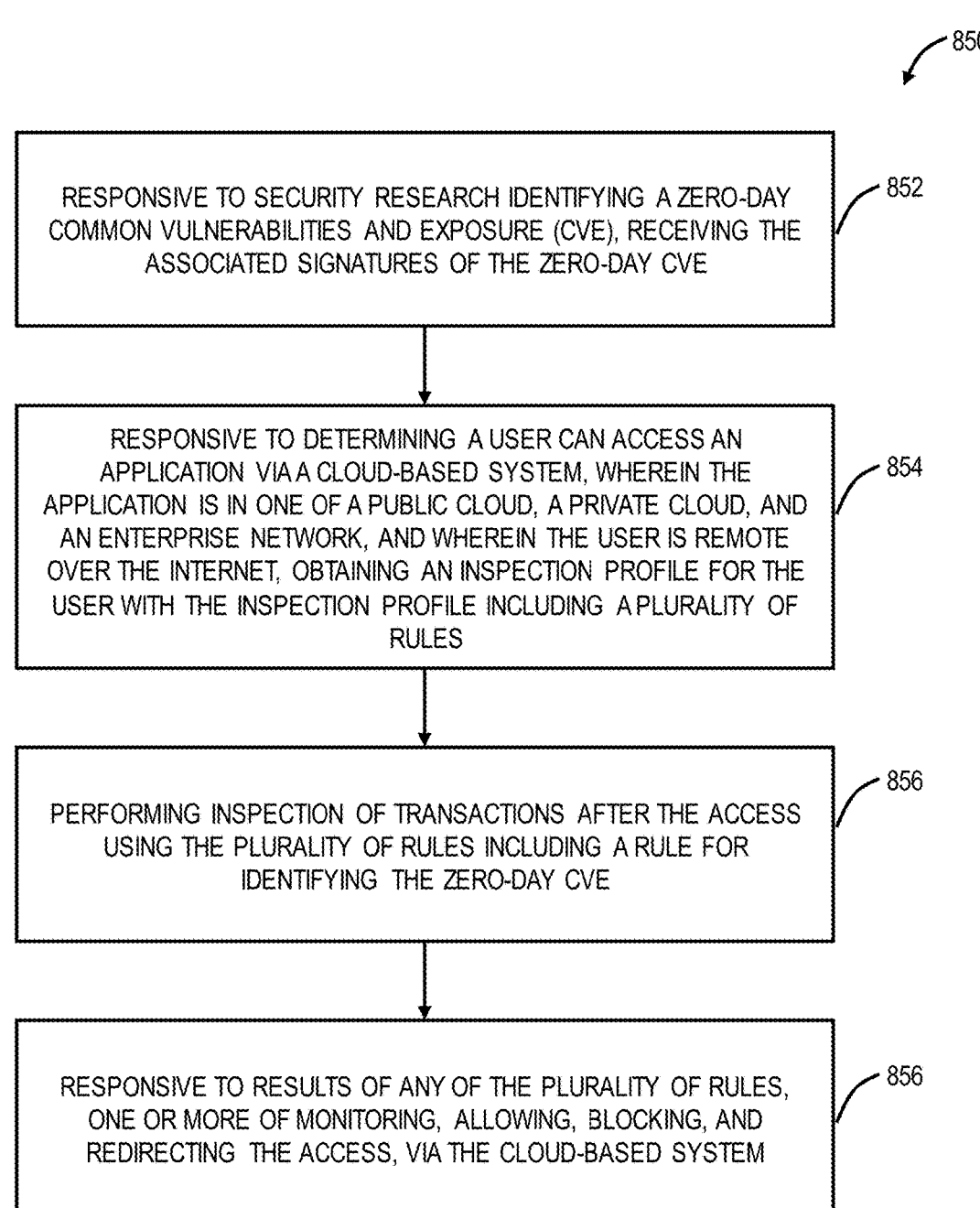

850

RESPONSIVE TO SECURITY RESEARCH IDENTIFYING A ZERO-DAY COMMON VULNERABILITIES AND EXPOSURE (CVE), RECEIVING THE ASSOCIATED SIGNATURES OF THE ZERO-DAY CVE

852

RESPONSIVE TO DETERMINING A USER CAN ACCESS AN APPLICATION VIA A CLOUD-BASED SYSTEM, WHEREIN THE APPLICATION IS IN ONE OF A PUBLIC CLOUD, A PRIVATE CLOUD, AND AN ENTERPRISE NETWORK, AND WHEREIN THE USER IS REMOTE OVER THE INTERNET, OBTAINING AN INSPECTION PROFILE FOR THE USER WITH THE INSPECTION PROFILE INCLUDING A PLURALITY OF RULES

854

PERFORMING INSPECTION OF TRANSACTIONS AFTER THE ACCESS USING THE PLURALITY OF RULES INCLUDING A RULE FOR IDENTIFYING THE ZERO-DAY CVE

856

RESPONSIVE TO RESULTS OF ANY OF THE PLURALITY OF RULES, ONE OR MORE OF MONITORING, ALLOWING, BLOCKING, AND REDIRECTING THE ACCESS, VIA THE CLOUD-BASED SYSTEM

ZERO TRUST PRIVATE APPLICATION ACCESS VIA SOCIAL MEDIA BASED VALIDATION FOR GOVERNMENT APPLICATIONS

CROSS-REFERENCE TO RELATED APPLICATION(S)

The present patent/application is a continuation-in-part of U.S. patent application Ser. No. 16/800,307, filed Feb. 25, 2020, and entitled "Secure application access systems and methods via a lightweight connector and a cloud-based system," which is a continuation of U.S. patent application Ser. No. 15/986,874, filed May 13, 2018, and entitled "Clientless connection setup for cloud-based virtual private access systems and methods," which is a continuation-in-part of U.S. patent application Ser. No. 15/158,153 filed May 18, 2016 (now U.S. Pat. No. 10,375,024, issued Aug. 6, 2019), and entitled "CLOUD-BASED VIRTUAL PRIVATE ACCESS SYSTEMS AND METHODS," which is a continuation-in-part of U.S. patent application Ser. No. 14/310, 348 filed Jun. 20, 2014 (now U.S. Pat. No. 9,350,710, issued May 24, 2016), and entitled "INTELLIGENT, COUD-BASED GLOBAL VIRTUAL PRIVATE NETWORK SYSTEMS AND METHODS," the contents of each are incorporated by reference herein in their entirety.

FIELD OF THE DISCLOSURE

The present disclosure generally relates to computer networking systems and methods. More particularly, the present disclosure relates to systems and methods for zero trust private application access for government applications.

BACKGROUND OF THE DISCLOSURE

The traditional view of an enterprise network (i.e., corporate, private, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA) and Zscaler Private Access (ZPA), available from Zscaler, Inc., the applicant and assignee of the present application.

ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

This Zero Trust Network Access (ZTNA) approach provides significant security in avoiding direct exposure of applications to the Internet. Rather, this ZTNA approach dials out from a connector. However, enterprise applications contain critical resources, and it is critical that any device accessing such applications, even though a ZTNA approach, are monitored.

BRIEF SUMMARY OF THE DISCLOSURE

The present disclosure relates to systems and methods for zero trust private application access for government applications. In various embodiments, systems and methods include, receiving a request from a user to access an application, determining if the user meets one or more requirements, wherein responsive to the user meeting the one or more requirements, presenting the user with a login page, validating credentials of the user with one or more additional sources, responsive to successful validation of the users' credentials, authenticating the user and evaluating one or more access policies for the user, and initiating a connection between the user and the application based on the one or more access policies.

The systems and methods can further include the connection between the user and the application being via an application connector. The login page can include a choice of social media services that have been configured for authentication. The one or more additional sources can include a social media service chosen from the one or more social media services, and the validating can include validating the users' credentials with the social media service. Responsive to receiving the request, the steps can include forwarding a Security Assertion Markup Language (SAML) request to a configured Identity Provider (IDP), wherein the determining, validating, and authenticating are performed by the IDP, and receiving validation from the IDP indicating that the authentication is successful. The authenticating can further include utilizing one or more of contextual access policies, and Multi-factor Authentication (MFA) in order to authenticate a user. The contextual access policies can include geo-location, network location, endpoint device posture, and social network, and the MFA can include soft tokens, one-time codes, push notifications, and utilization of biometric devices. The application can be a government application.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a block diagram of a user device, which may be used with the cloud-based system or the like.

FIG. 8 is a flowchart of a VPN process for an intelligent, cloud-based global VPN.

FIGS. 17 and 18 are network diagrams of a conventional network setup to share data between two companies (FIG. 17) such as for Merger and Acquisition (M&A) purposes or the like compared to a network setup using virtual private access (FIG. 18).

FIG. 31 is a process for maintaining dependencies in a set of rules for security scanning.

FIG. 32 is a process for predefined signatures for inspecting private application access.

DETAILED DESCRIPTION OF THE DISCLOSURE

Figure 1A:
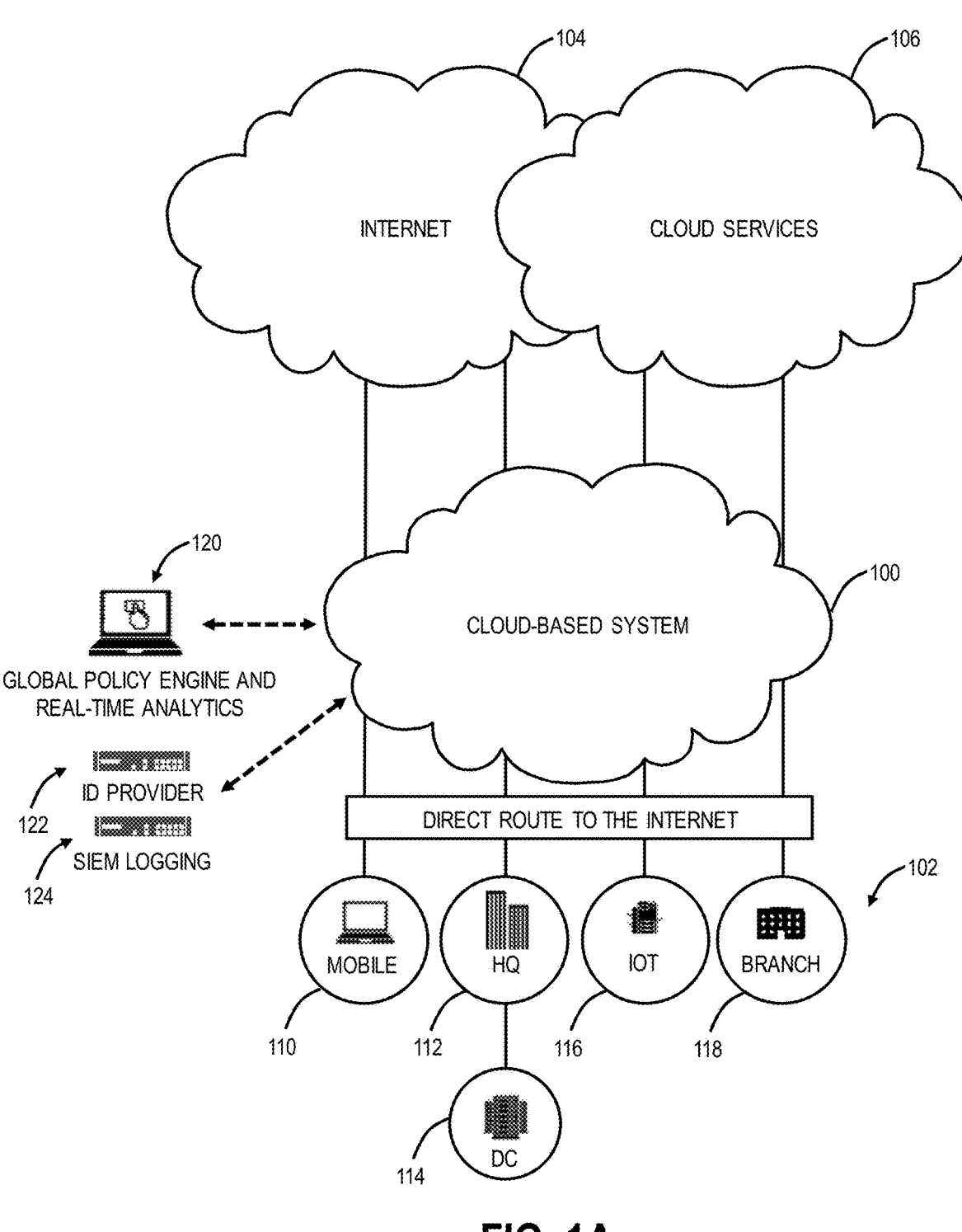
FIG. 1A is a network diagram of a cloud-based system offering security as a service.

The present disclosure relates to systems and methods for zero trust private application access for government applications. In various embodiments, systems and methods include receiving a request from a user to access an application and utilizing various services, such as IDPs and social media services, to determining if the user meets one or more requirements, wherein responsive to the user meeting the one or more requirements, presenting the user with a login page, and validating credentials of the user with the social media services. Responsive to successful validation of the users' credentials, the systems and methods initiate a connection between the user and the application based on one or more access policies. Zero Trust Citizen Access (ZTCA) provides citizens with simple, secure and highly scalable access to any public web or legacy applications.

Also, the present disclosure relates to systems and methods for maintaining dependencies in a set of rules for security scanning, such as in cloud-based Web Application Firewalls (WAF), Deep Packet Inspection (DPI), Intrusion Prevention Systems (IPS), Cloud-based web application and API protection (WAAP), and the like, as well as in non-cloud-based systems. The present disclosure solves the issue of saving rules in a database whilst maintaining any ordering and dependencies that exist between the different rules. The approach described herein utilizes a template to capture the dependency information between rules whilst keeping the rules separate and independent, in a database. We can also keep the template in the database allowing us to modify both the rules and dependency information dynamically.

Further, the present disclosure relates to systems and methods for Cloud-based web application and API protection (WAAP). The cloud-based WAAP approach can be combined with a ZTNA approach where critical applications are not exposed to the Internet, but securely accessed through a cloud-based system. The cloud-based WAAP protects applications and APIs against threats and fraud as well as ensures availability and compliance. The approach described herein leverages existing rules and threat intelligence from the cloud-based system, includes customizable rules such as the Open Web Application Security Project (OSWAP) rule and customer created or modified rules, real-time updates to ensure latest threats are blocked, and the like. All traffic can be logged to support forensic analysis and continuous updates. Finally, this approach can be integrated into an existing cloud-based system for ease of use, configuration, reporting, and the like from a single dashboard.

Also, systems and methods for cloud-based virtual private access of networked applications are described. At a high level, the systems and methods dynamically create a connection through a secure tunnel between three entities: an end-point, a cloud, and an on-premises redirection proxy. The connection between the cloud and on-premises proxy is dynamic, on-demand and orchestrated by the cloud. A key feature of the systems and methods is its security at the edge—there is no need to punch any holes in the existing on-premises firewall. The redirection proxy inside the enterprise (on premises) "dials out" and connects to the cloud as if too were an end-point. This on-demand dial-out capability and tunneling authenticated traffic back to the enterprise is a key differentiator of the systems and methods.

The paradigm of the virtual private access systems and methods is to give users network access to get to an application, not to the entire network. If a user is not authorized to get the application, the user should not be able to even see that it exists, much less access it. The virtual private access systems and methods provide a new approach to deliver secure access by decoupling applications from the network, instead providing access with a lightweight software connector, in front of the applications, an application on the user device, a central authority to push policy, and a cloud to stitch the applications and the software connectors together, on a per-user, per-application basis.

With the virtual private access, users can only see the specific applications allowed by policy. Everything else is "invisible" or "dark" to them. Because the virtual private access separates the application from the network, the physical location of the application becomes irrelevant—if applications are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to users and enterprises.

Example Cloud-Based System Architecture

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
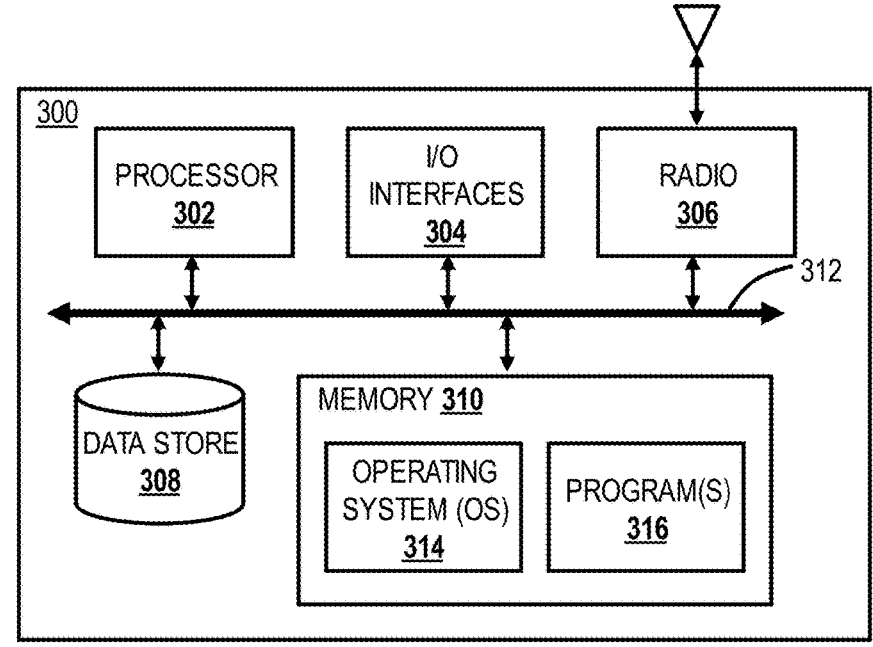

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118 and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
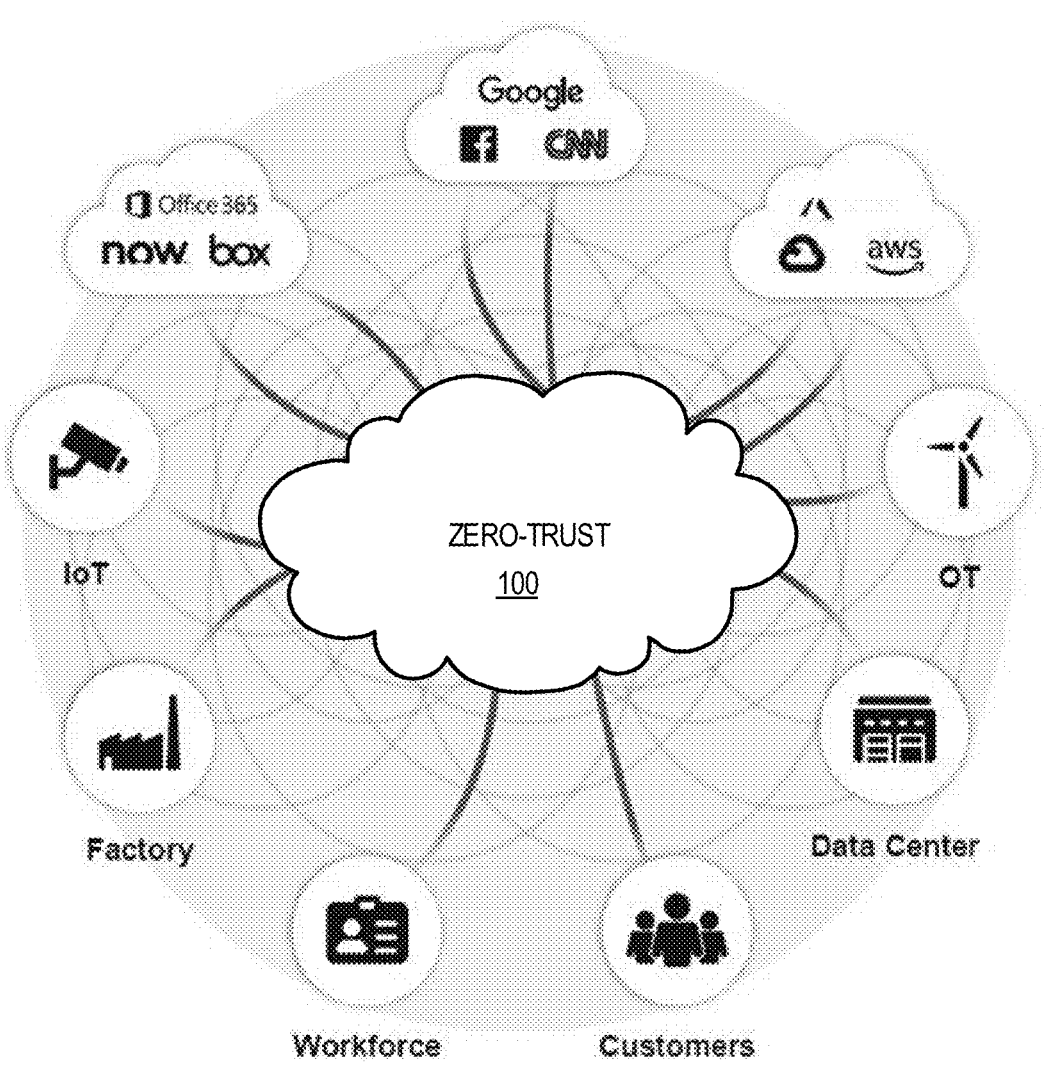
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time— before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
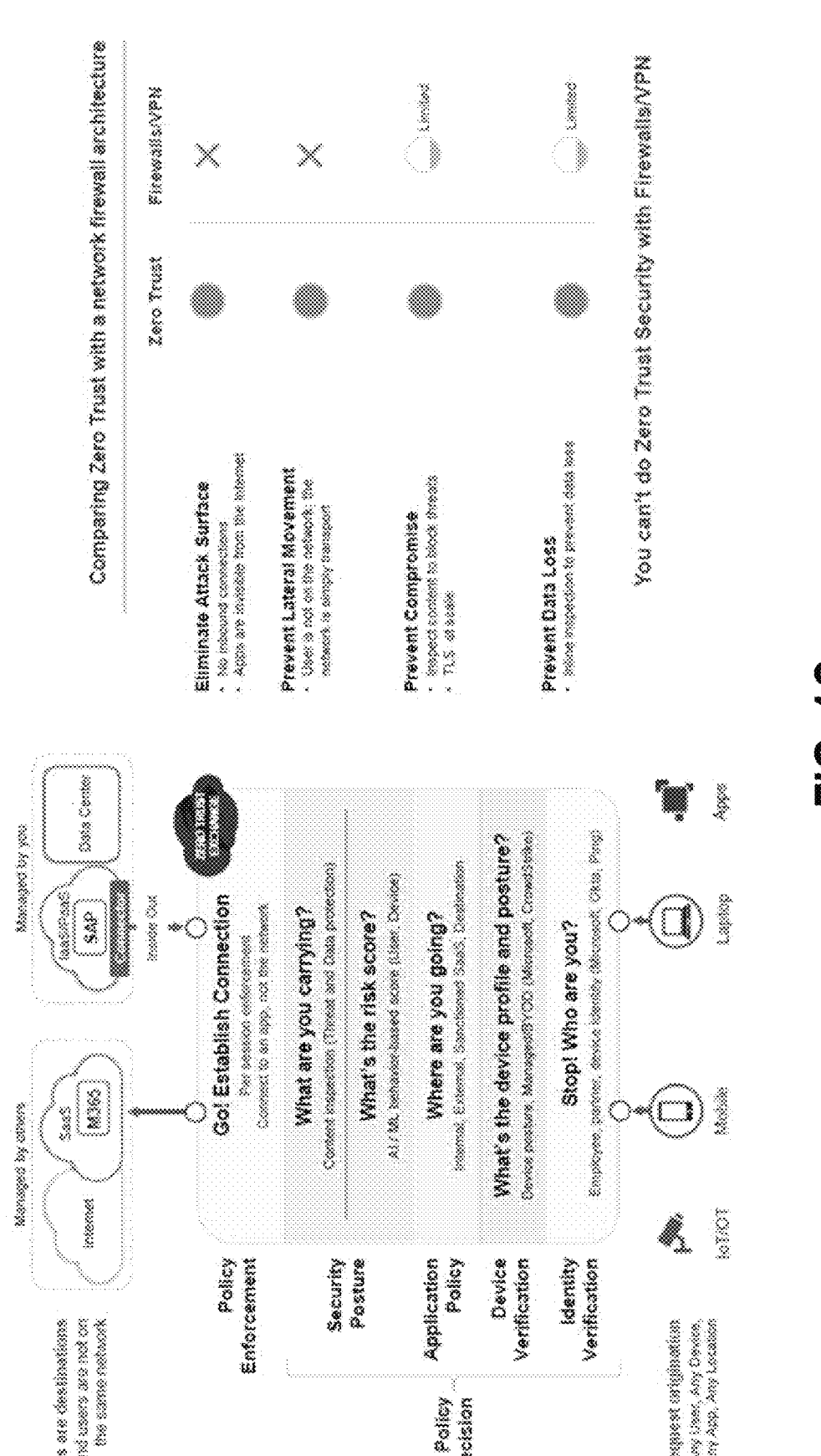
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
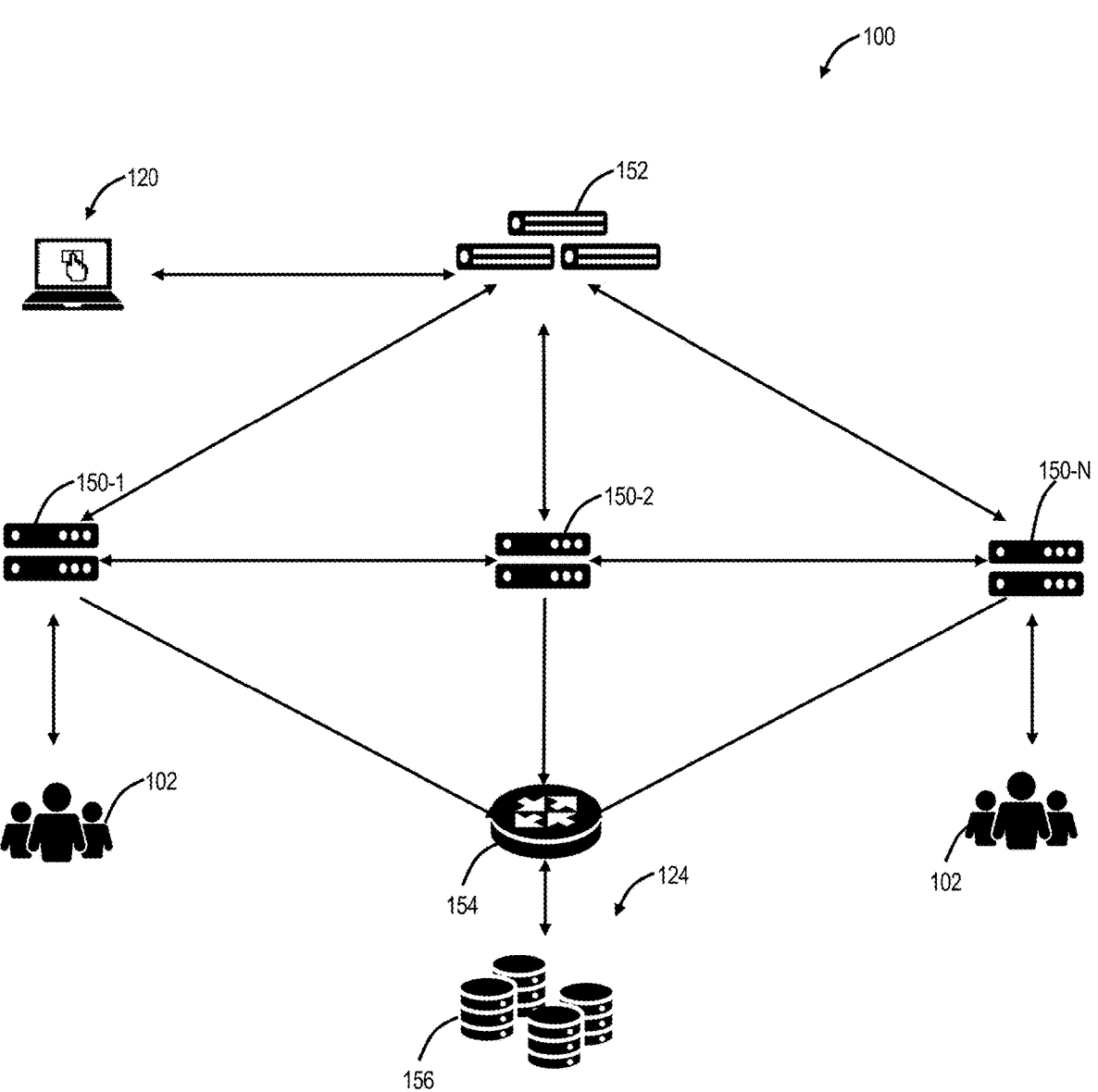
FIG. 2 is a network diagram of an example implementation of the cloud-based system.
Figure 4:
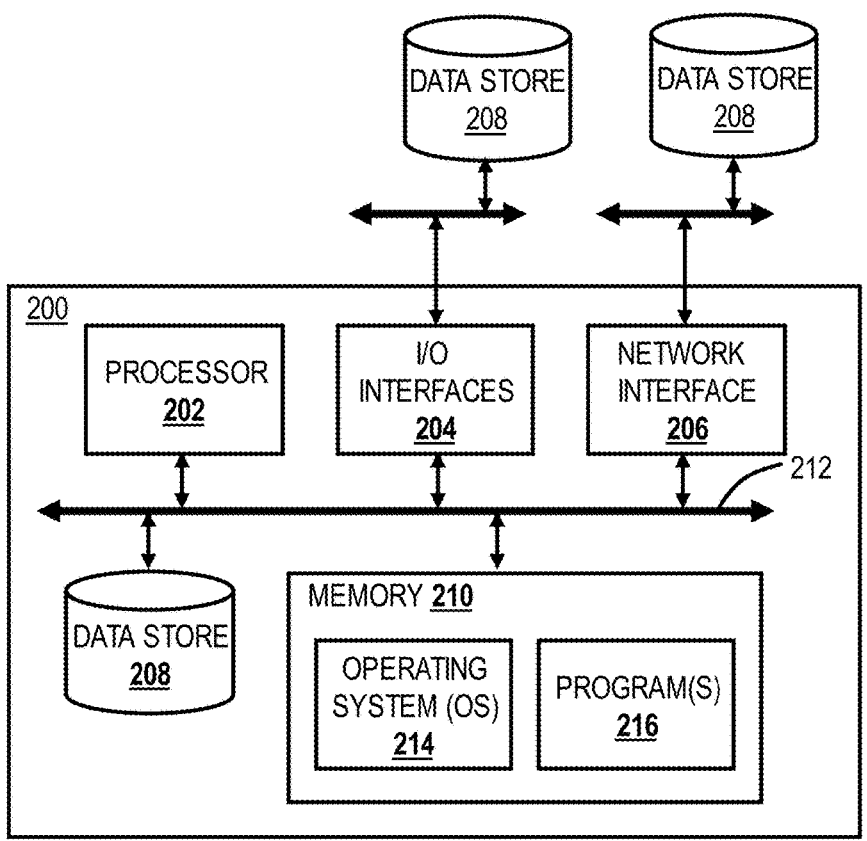
FIG. 4 is a block diagram of a server, which may be used in the cloud-based system, in other systems, or standalone.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

User Device Application for Traffic Forwarding and Monitoring

Figure 3:
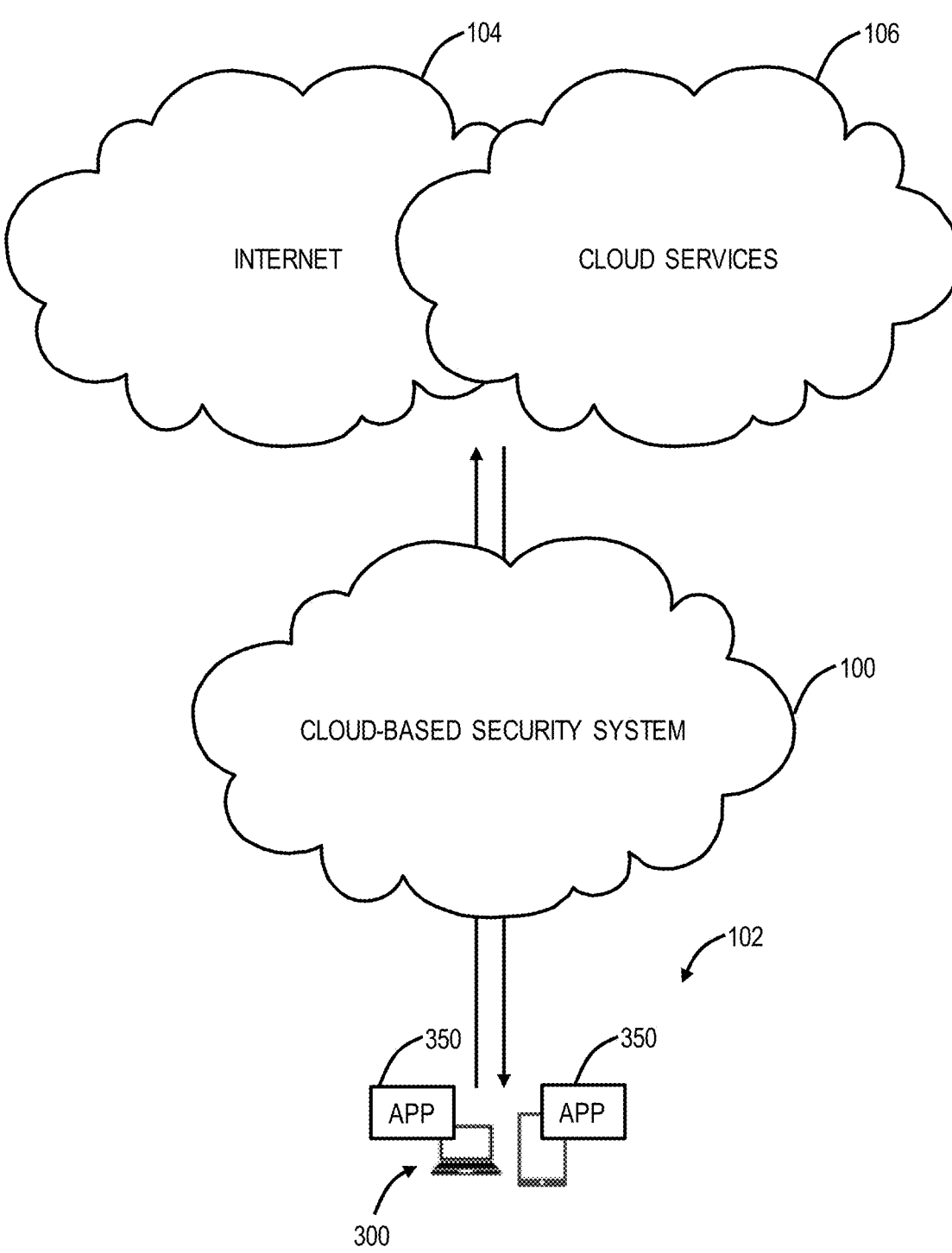
FIG. 3 is a network diagram of the cloud-based system illustrating an application on the user devices with users configured to operate through the cloud-based system.

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or user 102 setup.

Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

Figure 6:
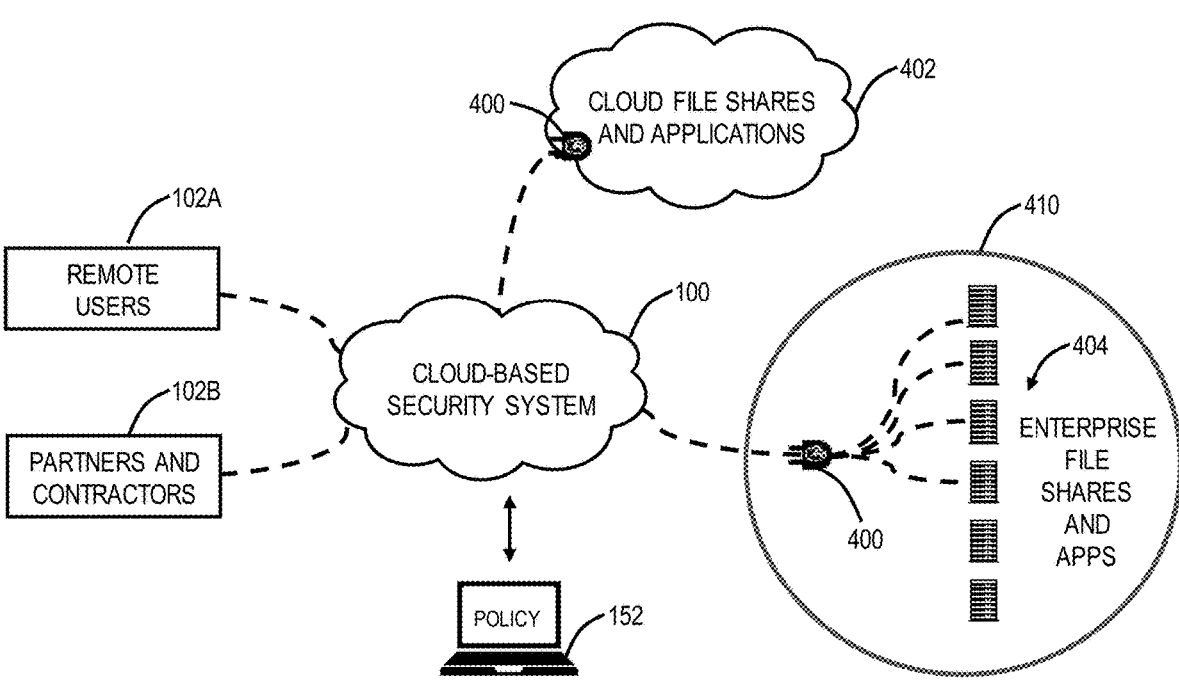
FIG. 6 is a network diagram of a Zero Trust Network Access (ZTNA) application utilizing the cloud-based system.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

VPN Architecture

Figure 7:
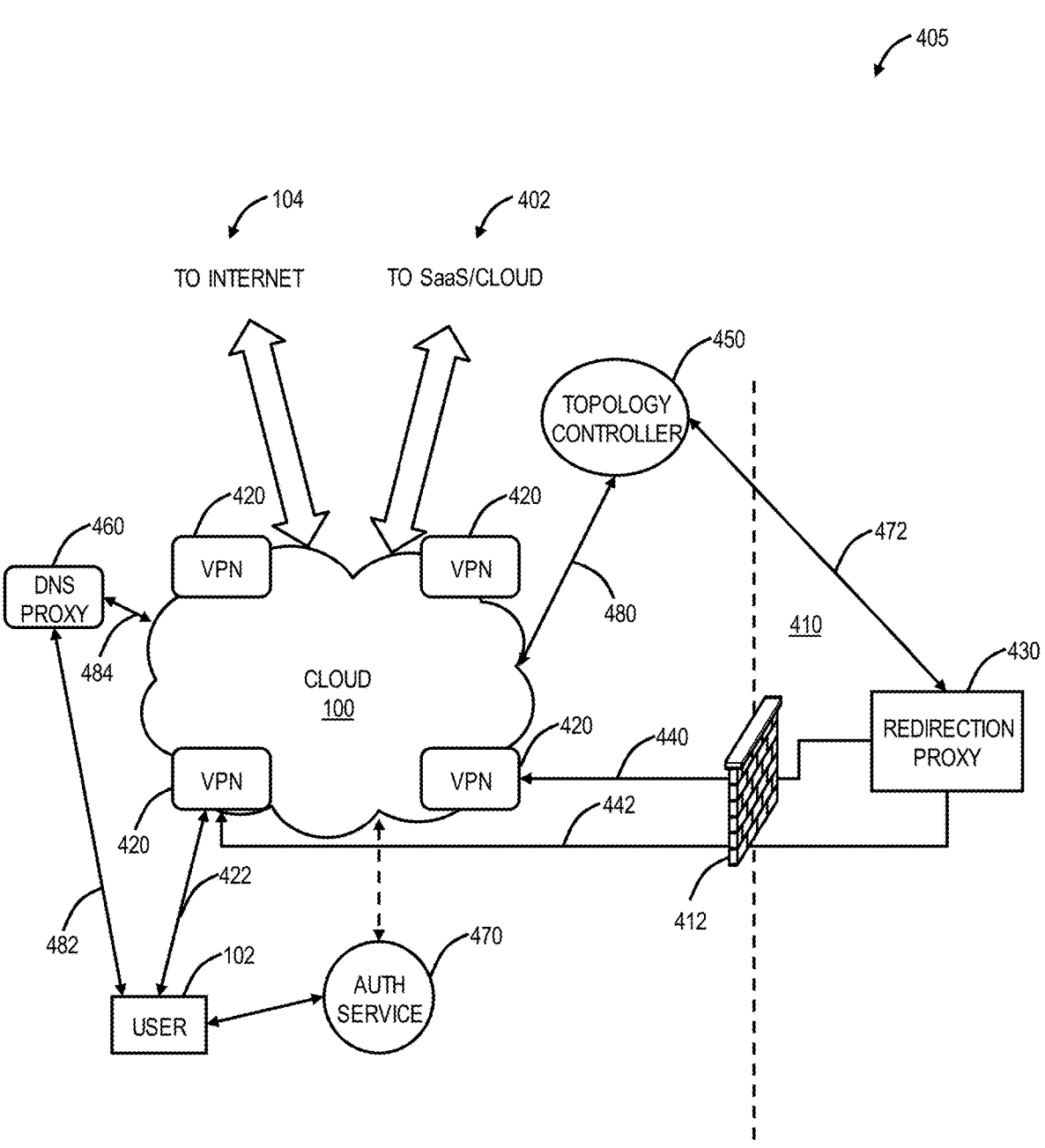
FIG. 7 is a network diagram of a VPN architecture for an intelligent, cloud-based global VPN.

FIG. 7 is a network diagram of a VPN architecture 405 for an intelligent, cloud-based global VPN. For illustration purposes, the VPN architecture 405 includes the cloud-based system 100, the Internet 104, the applications 402 in SaaS/public cloud systems, and the enterprise network 410. The VPN architecture 405 also includes a user 102, which can include any computing device/platform connecting to the cloud-based system 100, the Internet 104, the applications 402, and the enterprise network 410. The VPN architecture 405 includes a single user 102 for illustration purposes, but those of ordinary skill in the art will recognize that the VPN architecture 405 contemplates a plurality of users 102. The user 102 can be a nomadic user, a regional/branch office, etc. That is, the user 102 can be any user of the enterprise network 410 that is physically located outside a firewall 412 associated with the enterprise network 410. The SaaS/public cloud systems can include any systems containing computing and data assets in the cloud such as, for example, Microsoft OneDrive, Google Drive, Dropbox, Apple iCloud, Customer Relationship Management (CRM) systems, SCM, Sales management systems, etc. The enterprise network 410 includes local computing and data assets behind the firewall 412 for additional security on highly confidential assets or legacy assets not yet migrated to the cloud.

The user 102 needs to access the Internet 104, the SaaS/public cloud systems for the applications 402, and the enterprise network 410. Again, conventionally, the solution for secure communication, the user 102 has a VPN connection through the firewall 412 where all data is sent to the enterprise network 410, including data destined for the Internet 104 or the SaaS/public cloud systems for the applications 402. Furthermore, this VPN connection dials into the enterprise network 410. The systems and methods described herein provide the VPN architecture 405, which provides a secure connection to the enterprise network 410 without bringing all traffic, e.g., traffic for the Internet 104 or the SaaS/public cloud systems, into the enterprise network 410 as well as removing the requirement for the user 102 to dial into the enterprise network 410.

Instead of the user 102 creating a secure connection through the firewall 412, the user 102 connects securely to a VPN device 420 located in the cloud-based system 100 through a secure connection 422. Note, the cloud-based system 100 can include a plurality of VPN devices 420. The VPN architecture 405 dynamically routes traffic between the user 102 and the Internet 104, the SaaS/public cloud systems for the applications 402, and securely with the enterprise network 410. For secure access to the enterprise network 410, the VPN architecture 405 includes dynamically creating connections through secure tunnels between three entities: the VPN device 420, the cloud, and an on-premises redirection proxy 430. The connection between the cloud-based system 100 and the on-premises redirection proxy 430 is dynamic, on-demand and orchestrated by the cloud-based system 100. A key feature of the systems and methods is its security at the edge of the cloud-based system 100—there is no need to punch any holes in the existing on-premises firewall 412. The on-premises redirection proxy 430 inside the enterprise network 410 "dials out" and connects to the cloud-based system 100 as if too were an end-point via secure connections 440, 442. This on-demand dial-out capability and tunneling authenticated traffic back to the enterprise network 410 is a key differentiator.

The VPN architecture 405 includes the VPN devices 420, the on-premises redirection proxy 430, a topology controller

450, and an intelligent DNS proxy 460. The VPN devices 420 can be Traffic (VP N) distribution servers and can be part of the cloud-based system 100. In an embodiment, the cloud-based system 100 can be a security cloud such as available from Zscaler, Inc. (www.zscaler.com) performing functions on behalf of every client that connects to it: a) allowing/denying access to specific Internet sites/apps—based on security policy and absence/presence of malware in those sites, and b) set policies on specific SaaS apps and allowing/denying access to specific employees or groups.

The on-premises redirection proxy 430 is located inside a perimeter of the enterprise network 410 (inside the private cloud or inside the corporate data center—depending on the deployment topology). It is connected to a local network and acts as a "bridge" between the users 102 outside the perimeter and apps that are inside the perimeter through the secure connections 440, 442. But, this "bridge" is always closed—it is only open to the users 102 that pass two criteria: a) they must be authenticated by an enterprise authentication service 470, and b) the security policy in effect allows them access to "cross the bridge."

When the on-premises redirection proxy 430 starts, it establishes a persistent, long-lived connection 472 to the topology controller 450. The topology controller 450 connects to the on-premises redirection proxy 430 through a secure connection 472 and to the cloud-based system 100 through a secure connection 480. The on-premises redirection proxy 430 waits for instruction from the topology controller 450 to establish tunnels to specific VPN termination nodes, i.e., the VPN devices 420, in the cloud-based system 100. The on-premises redirection proxy 430 is most expediently realized as custom software running inside a virtual machine (VM). The topology controller 450, as part of the non-volatile data for each enterprise, stores the network topology of a private network of the enterprise network 410, including, but not limited to, the internal domain name(s), subnet(s) and other routing information.

The DNS proxy 460 handles all domain names to Internet Protocol (IP) Address resolution on behalf of endpoints (clients). These endpoints are user computing devices—such as mobile devices, laptops, tablets, etc. The DNS proxy 460 consults the topology controller 450 to discern packets that must be sent to the Internet 104, the SaaS/public cloud systems, vs. the enterprise network 410 private network. This decision is made by consulting the topology controller 450 for information about a company's private network and domains. The DNS proxy 460 is connected to the user 102 through a connection 482 and to the cloud-based system 100 through a connection 484.

The VPN device 420 is located in the cloud-based system 100 and can have multiple points-of-presence around the world. If the cloud-based system 100 is a distributed security cloud, the VPN device 420 can be located with enforcement nodes 150. In general, the VPN device 420 can be implemented as software instances on the enforcement nodes 150, as a separate virtual machine on the same physical hardware as the enforcement nodes 150, or a separate hardware device such as the server 200, but part of the cloud-based system 100. The VPN device 420 is the first point of entry for any client wishing to connect to the Internet 104, SaaS apps, or the enterprise private network. In addition to doing traditional functions of a VPN server, the VPN device 420 works in concert with the topology controller 450 to establish on-demand routes to the on-premises redirection proxy 430. These routes are set up for each user on demand. When the VPN device 420 determines that a packet from the user 102 is destined for the enterprise private network, it encapsulates the packet and sends it via a tunnel between the VPN device 420 and the on-premises redirection proxy 430. For packets meant for the Internet 104 or SaaS clouds, the VPN device 420 can forwards it to the enforcement nodes 150—to continue processing as before or send directly to the Internet 104 or SaaS clouds.

VPN Process

FIG. 8 is a flowchart of a VPN process 500 for an intelligent, cloud-based global VPN. The VPN process 500 can be implemented through the VPN architecture 405. The VPN process 500 includes the user 102 connecting to the cloud-based system 100 through authentication (step 510). Once the authentication is complete, a VPN is established between the user 102 and a VPN server in the cloud-based system 100 and DNS for the user 102 is set to a DNS proxy 460 (step 520). Now, the user 102 has a secure VPN connection to the cloud-based system 100. Subsequently, the user 102 sends a request to the cloud-based system 100 via the DNS proxy 460 (step 530). Here, the request can be anything—request for the enterprise network 410, the Internet 104, the applications 402 in the SaaS/public cloud systems, the applications 404 in the enterprise network 410, etc. The DNS proxy 460 contacts the topology controller 450 with the identity of the user and the request (step 540). That is, whenever the user 102 wishes to reach a destination (Internet, Intranet, SaaS, etc.), it will consult the DNS proxy 460 to obtain the address of the destination.

For non-enterprise requests, the cloud-based system 100 forwards the request per policy (step 550). Here, the cloud-based system 100 can forward the request based on the policy associated with the enterprise network 410 and the user 102. With the identity of the user and the enterprise they belong to, the VPN server will contact the topology controller 450 and pre-fetch the enterprise private topology. For enterprise requests, the topology controller 450 fetches a private topology of the enterprise network 410, instructs the redirection proxy 430 to establish an outbound tunnel to the VPN server, the redirection proxy 430 establishes the outbound tunnel, and requests are forward between the user 102 and the enterprise network 410 securely (step 560). Here, the DNS proxy 460 works with the topology controller 450 to determine the local access in the enterprise network 410, and the topology controller 450 works with the redirection proxy 430 to dial out a secure connection to the VPN server. The redirection proxy 430 establishes an on-demand tunnel to the specific VPN server so that it can receive packets meant for its internal network.

Global VPN Applications

Advantageously, the systems and methods avoid the conventional requirement of VPN tunneling all data into the enterprise network 410 and hair-pinning non-enterprise data back out. The systems and methods also allow the enterprise network 410 to have remote offices, etc. without requiring large hardware infrastructures—the cloud-based system 100 bridges the users 102, remote offices, etc. to the enterprise network 410 in a seamless manner while removing the requirement to bring non-enterprise data through the enterprise network 410. This recognizes the shift to mobility in enterprise applications. Also, the VPN tunnel on the user 102 can leverage and use existing VPN clients available on the user devices 300. The cloud-based system 100, through the VPN architecture 405, determines how to route traffic for the user 102 efficiently—only enterprise traffic is routed securely to the enterprise network 410. Additionally, the VPN architecture 405 removes the conventional requirement of tunneling into the enterprise network 410, which can be an opportunity for security vulnerabilities. Instead, the redirection proxy 430 dials out of the enterprise network 410.

The systems and methods provide, to the user (enterprise user), a single, seamless way to connect to Public and Private clouds—with no special steps needed to access one vs. the other. To the IT Admin, the systems and methods provide a single point of control and access for all users—security policies and rules are enforced at a single global cloud chokepoint—without impacting user convenience/performance or weakening security.

Virtual Private Access Via the Cloud

Figure 9:
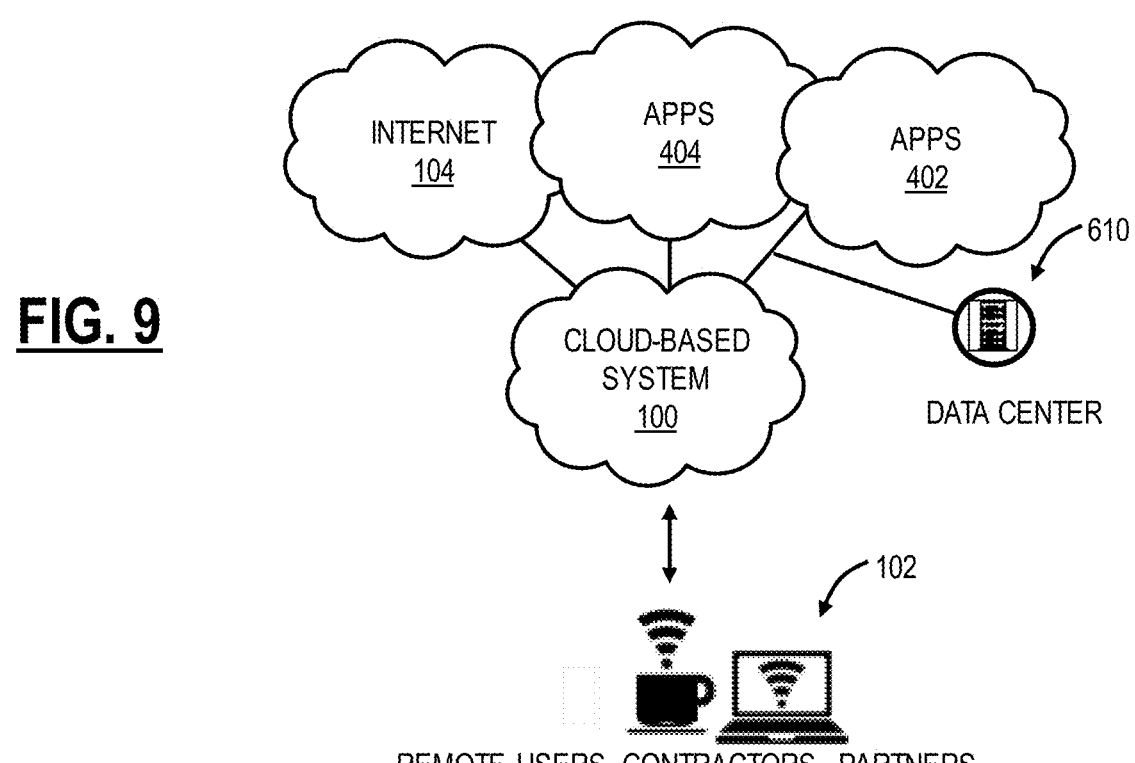
FIG. 9 is a network diagram illustrating the cloud-based system with private applications and data centers connected thereto to provide virtual private access through the cloud-based system.

FIG. 9 is a network diagram illustrating the cloud-based system 100 with private applications 402, 404 and data centers 610 connected thereto to provide virtual private access through the cloud-based system 100. In an aspect, the virtual private access described herein leverages the cloud-based system 100 to enable various users 102 including remote users, contractors, partners, business customers, etc., i.e., anyone who needs access to the private applications 402, 404 and the data centers 610 access, without granting unfettered access to the internal network, without requiring hardware or appliances, and in a seamless manner from the users' 102 perspective. The private applications 402, 404 include applications dealing with financial data, personal data, medical data, intellectual property, records, etc., that is the private applications 404 can be available on the enterprise network 410, but not available remotely except conventionally via VPN access. Examples of the private applications 402, 404 can include Customer Relationship Management (CRM), sales automation, financial applications, time management, document management, etc. Also, the applications 402, 404 can be B2B applications or services as described herein.

The virtual private access is a new technique for the users 102 to access the file shares and applications 402, 404, without the cost, hassle or security risk of VPNs, which extend network access to deliver app access. The virtual private access decouples private internal applications from the physical network to enable authorized user access to the file shares and applications 402, 404, without the security risk or complexity of VPNs. That is, virtual private access takes the "Network" out of VPNs.

In the virtual private access, the users 102, the file shares and applications 402, 404, are communicatively coupled to the cloud-based system 100, such as via the Internet 104 or the like. On the client-side, at the users 102, the applications 402, 404 provision both secure remote access and optionally accessibility to the cloud-based system 100. The application 402, 404 establishes a connection to the closest enforcement node 150 in the cloud-based system 100 at startup and may not accept incoming requests.

At the file shares and applications 402, 404, the lightweight connectors 400 sit in front of the applications 402, 404. The lightweight connectors 400 become the path to the file shares and applications 402, 404 behind it, and connect only to the cloud-based system 100. The lightweight connectors 400 can be lightweight, ephemeral binary, such as deployed as a virtual machine, to establish a connection between the file shares and applications 402, 404 and the cloud-based system 100, such as via the closest enforcement node 150. The lightweight connectors 400 do not accept inbound connections of any kind, dramatically reducing the overall threat surface. The lightweight connectors 400 can be enabled on a standard VMware platform; additional lightweight connectors 400 can be created in less than 5 seconds to handle additional application instances. By not accepting inbound connections, the lightweight connectors 400 make the file shares and applications 402, 404 "dark," removing a significant threat vector.

The policy can be established and pushed by policy engines in the central authority 152, such as via a distributed cluster of multi-tenant policy engines that provide a single interface for all policy creation. Also, no data of any kind transits the policy engines. The enforcement nodes 150 in the security cloud stitch connections together, between the users 102 and the file shares and applications 402, 404, without processing traffic of any kind. When the user 102 requests an application in the file shares and applications 402, 404, the policy engine delivers connection information to the application 350 and app-side enforcement nodes 150, which includes the location of a single enforcement nodes 150 to provision the client/app connection. The connection is established through the enforcement nodes 150, and is encrypted with a combination of the customer's client and server-side certificates. While the enforcement nodes 150 provision the connection, they do not participate in the key exchange, nor do they have visibility into the traffic flows.

Advantageously, the virtual private access provides increased security in that the file shares and applications 402, 404 are visible only to the users 102 that are authorized to access them; unauthorized users are not able to even see them. Because application access is provisioned through the cloud-based system 100, rather than via a network connection, the virtual private access makes it impossible to route back to applications. The virtual private access is enabled using the application 350, without the need to launch or exit VPN clients. The application access just works in the background enabling application-specific access to individual contractors, business partners or other companies, i.e., the users 102.

The virtual private access provides capital expense (CAPEX) and operating expense (OPEX) reductions as there is no hardware to deploy, configure, or maintain. Legacy VPNs can be phased out. Internal IT can be devoted to enabling business strategy, rather than maintaining network "plumbing." Enterprises can move apps to the cloud on their schedule, without the need to re-architect, set up site-to-site VPNs or deliver a substandard user experience.

The virtual private access provides easy deployment, i.e., put lightweight connectors 400 in front of the file shares and applications 402, 404, wherever they are. The virtual private access will automatically route to the location that delivers the best performance. Wildcard app deployment will discover applications upon request, regardless of their location, then build granular user access policies around them. There is no need for complex firewall rules, Network Address Translation issues or policy juggling to deliver application access. Further, the virtual private access provides seamless integration with existing Single Sign-On (SSO) infrastructure.

Figure 10:
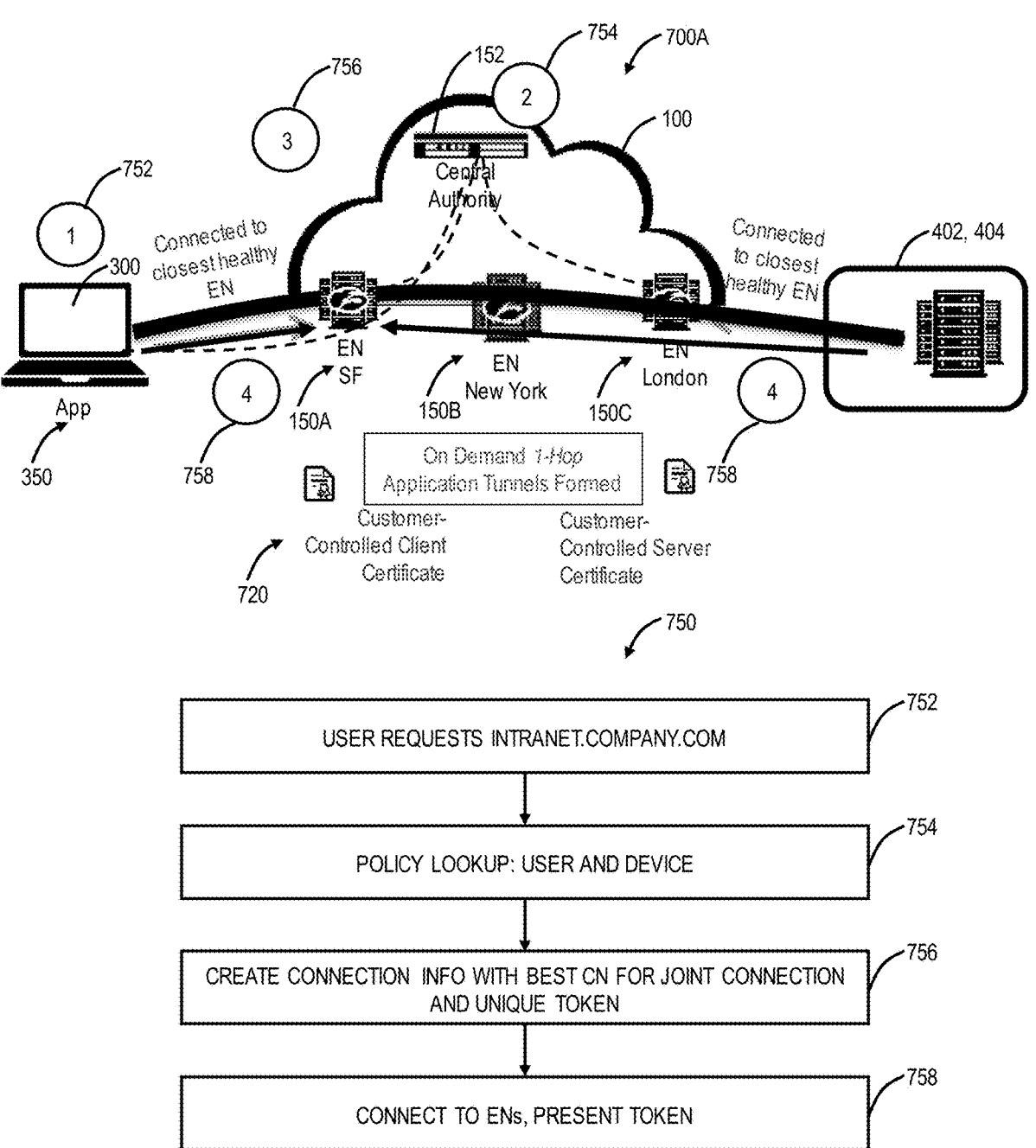
FIG. 10 is a network diagram of a virtual private access network and a flowchart of a virtual private access process implemented thereon.

FIG. 10 is a network diagram of a virtual private access network 700A and a flowchart of a virtual private access process 750 implemented thereon. The cloud-based system 100 includes three enforcement nodes 150A, 150B, 150C, assume for illustration purposes in San Francisco, New York, and London, respectively. The user 102 has the application 350 executing on the user device 300, which is communicatively coupled to the enforcement node 150A. The enterprise file share and application 402, 404 is communicatively coupled to the enforcement node 150C. Note, there can be direct connectivity between the enforcement nodes 150A, 150C, the enforcement nodes 150A, 150C can connect through the enforcement node 150B, or both the user 102 and the enterprise file share and application 402, 404 can be connected to the same node 150. That is, the architecture of the cloud-based system 100 can include various implementations.

The virtual private access process 750 is described with reference to both the user 102, the cloud-based system 100, and the enterprise file share and application 402, 404. First, the user 102 is executing the application 350 on the user device 300, in the background. The user 102 launches the application 350 and can be redirected to an enterprise ID provider or the like to sign on, i.e., a single sign on, without setting up new accounts. Once authenticated, Public Key Infrastructure (PKI) certificate 720 enrollment occurs, between the user 102 and the enforcement node 150A. With the application 350 executing on the user device, the user 102 makes a request to the enterprise file share and application 402, 404, e.g., intranet.company.com, crm.company-.com, etc. (step 752). Note, the request is not limited to web applications and can include anything such as a remote desktop or anything handling any static Transmission Control Protocol (TCP) or User Datagram Protocol (UDP) applications.

This request is intercepted by the enforcement node 150A and redirected to the central authority 152, which performs a policy lookup for the user 102 and the user device 300 (step 754), transparent to the user 102. The central authority 152 determines if the user 102 and the user device 300 are authorized for the enterprise file share and application 402, 404. Once authorization is determined, the central authority 152 provides information to the enforcement nodes 150A, 150B, 150C, the application 350, and the lightweight connectors 400 at the enterprise file share and application 402, 404, and the information can include the certificates 720 and other details necessary to stitch secure connections between the various devices. Specifically, the central authority 152 can create connection information with the best enforcement nodes 150 for joint connections, from the user 102 to the enterprise file share and application 402, 404, and the unique tokens (step 756). With the connection information, the enforcement node 150A connects to the user 102, presenting a token, and the enforcement node 150C connects to the lightweight connector 400, presenting a token (step 758). Now, a connection is stitched between the user 102 to the enterprise file share and application 402, 404, through the application 350, the enforcement nodes 150A, 1506, 150C, and the lightweight connector 400.

Comparison—VPN with Virtual Private Access

Figure 11:
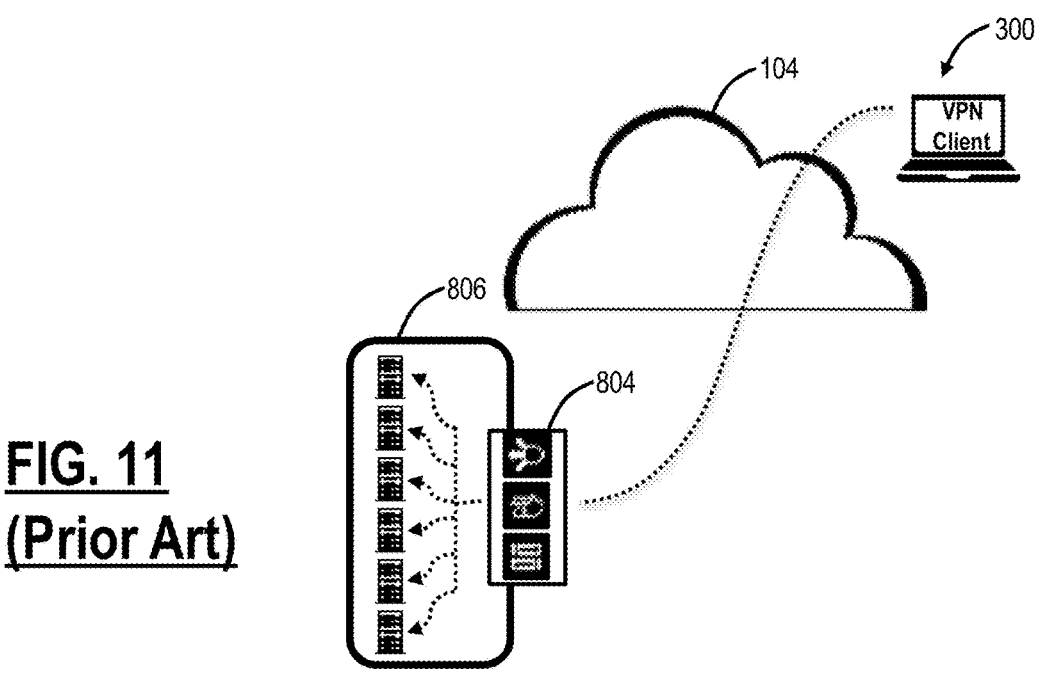
FIGS. 11 and 12 are network diagrams of a VPN configuration (FIG. 11) compared to virtual private access (FIG. 12) illustrating the differences therein.
Figure 12:
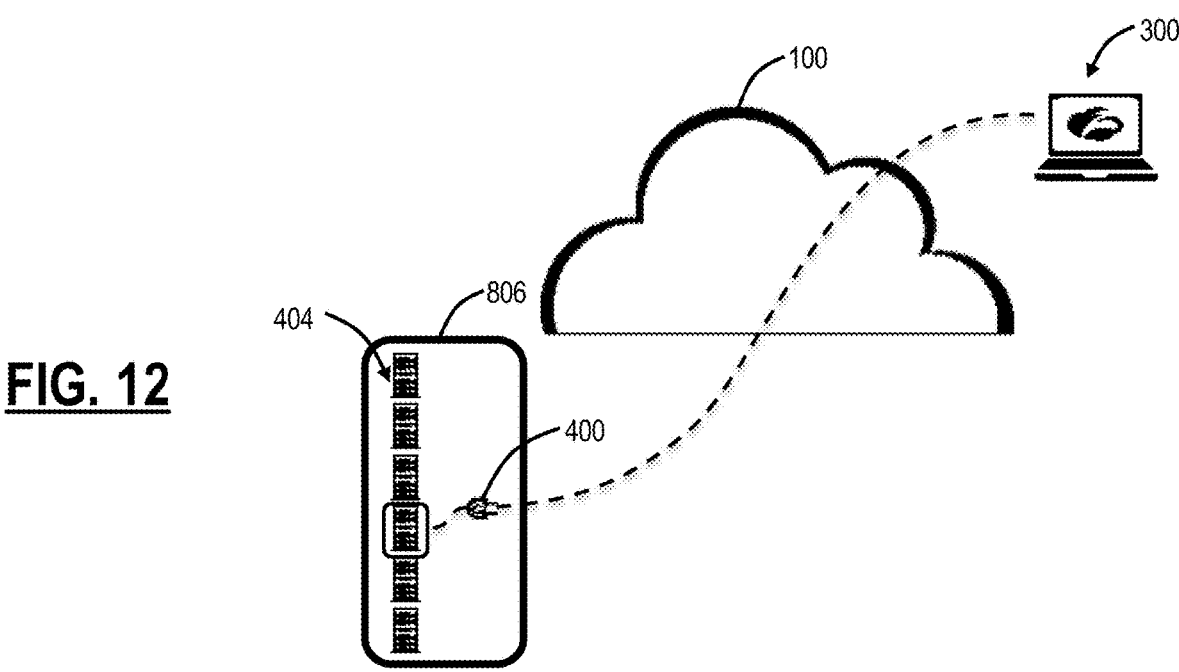

FIGS. 11 and 12 are network diagrams of a VPN configuration (FIG. 11) compared to virtual private access (FIG. 12) illustrating the differences therein. In FIG. 11, a user device 300 connects to a VPN termination device 804 associated with an enterprise network 806 via the Internet 104, such that the user device 300 is on the enterprise network 806, where associated applications reside. Of course, any malware on the user device 300 or anyone that steals the user device 300 is also on the enterprise network 806. The VPN termination device 804 creates a Distributed Denial-of-Service (DDoS) attack surface, adds infrastructure cost and creates network complexity as applications grow. Conversely, in FIG. 12, the user device 300 uses the virtual private access via the cloud-based system 100 to connect to the lightweight connector 400 associated with a specific application 404. The virtual private access provides granular access by the user device 300 and the application, and the user device 300 is not on the enterprise network 806. Thus, the application is never directly exposed to the user device 300, the security cloud handles provisioning, and the traffic remains completely private.

Comparison—Private Applications in the Public Cloud

Figure 13:
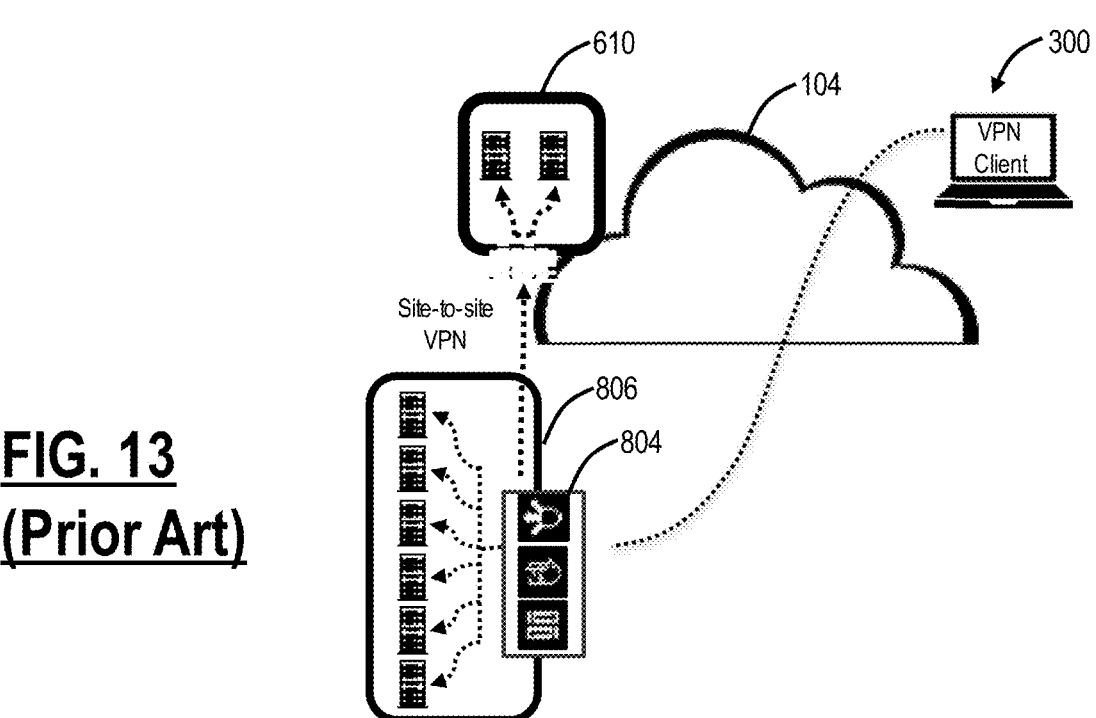
FIGS. 13 and 14 are network diagrams of conventional private application access in the public cloud (FIG. 13) compared to private applications in the public cloud with virtual private access (FIG. 14).
Figure 14:
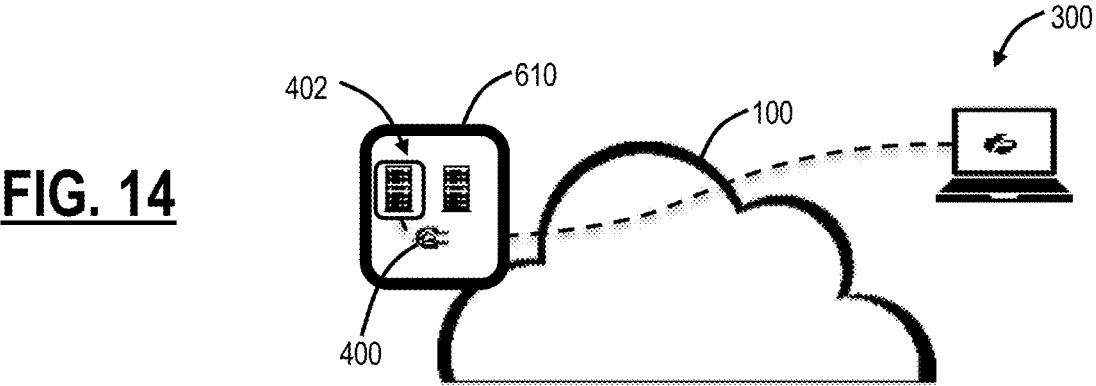

FIGS. 13 and 14 are network diagrams of conventional private application access in the public cloud (FIG. 13) compared to private application in the public cloud with virtual private access (FIG. 14). In FIG. 13, the user device 300 still has to connect to the enterprise network 806 via the VPN termination device 804 as in FIG. 11, and the cloud applications, such as in the data center 610, are accessible via the enterprise network 806 via a site-to-site VPN between the enterprise network 806 and the data center 610. Disadvantageously, the user experience is eroded for the user device 300 and agility is hampered for the enterprise by networking concerns and capability. In FIG. 14, the virtual private access abstracts the application 402, in the data center 610, from the IP address, so location is irrelevant. The enterprise can move private applications to the cloud securely, as needed.

Comparison—Contractor/Private Application Access

Figures 15, 16:
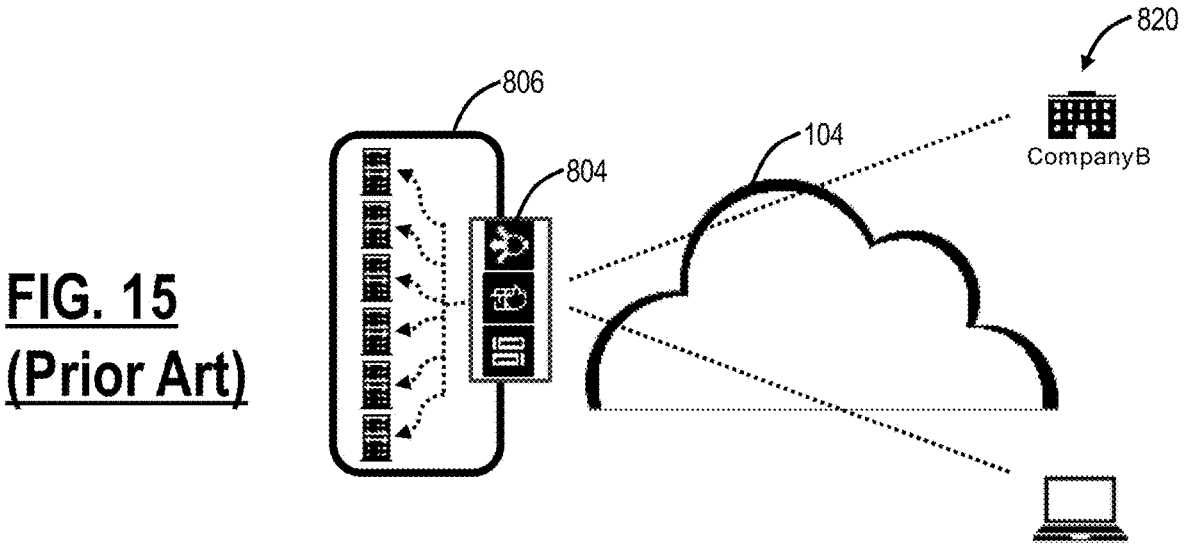
FIGS. 15 and 16 are network diagrams of conventional contractor/partner access (FIG. 15) of applications in the enterprise network compared to contractor/partner access (FIG. 16) of the applications with virtual private access.

FIGS. 15 and 16 are network diagrams of conventional contractor/partner access (FIG. 15) of applications in the enterprise network 806 compared to contractor/partner access (FIG. 16) of the applications with virtual private access. Contractor/partner access includes providing third parties access to applications on the enterprise network 806, for a variety of purposes. In FIG. 15, similar to FIGS. 11 and 13, contractor/partner access includes VPN connections to the VPN termination device 804, providing contractor/partners 820 full access to the enterprise network 806, not just the specific application or asset that they require. Unfortunately, stolen credentials can allow hackers to get into networks or to map assets for later assault. In FIG. 16, the virtual private access, using the cloud-based system 100, allows access specific to applications or assets as needed by the contractor/partners 820, via the lightweight connector 400. Thus, the contractor/partners 820 do not have full network access, the access is specific to each user, and the connections are provisioned dynamically, avoiding a direct network connection that can be misused or exploited.

Comparison—Example Application—M&A Data Access

Figures 17, 18:
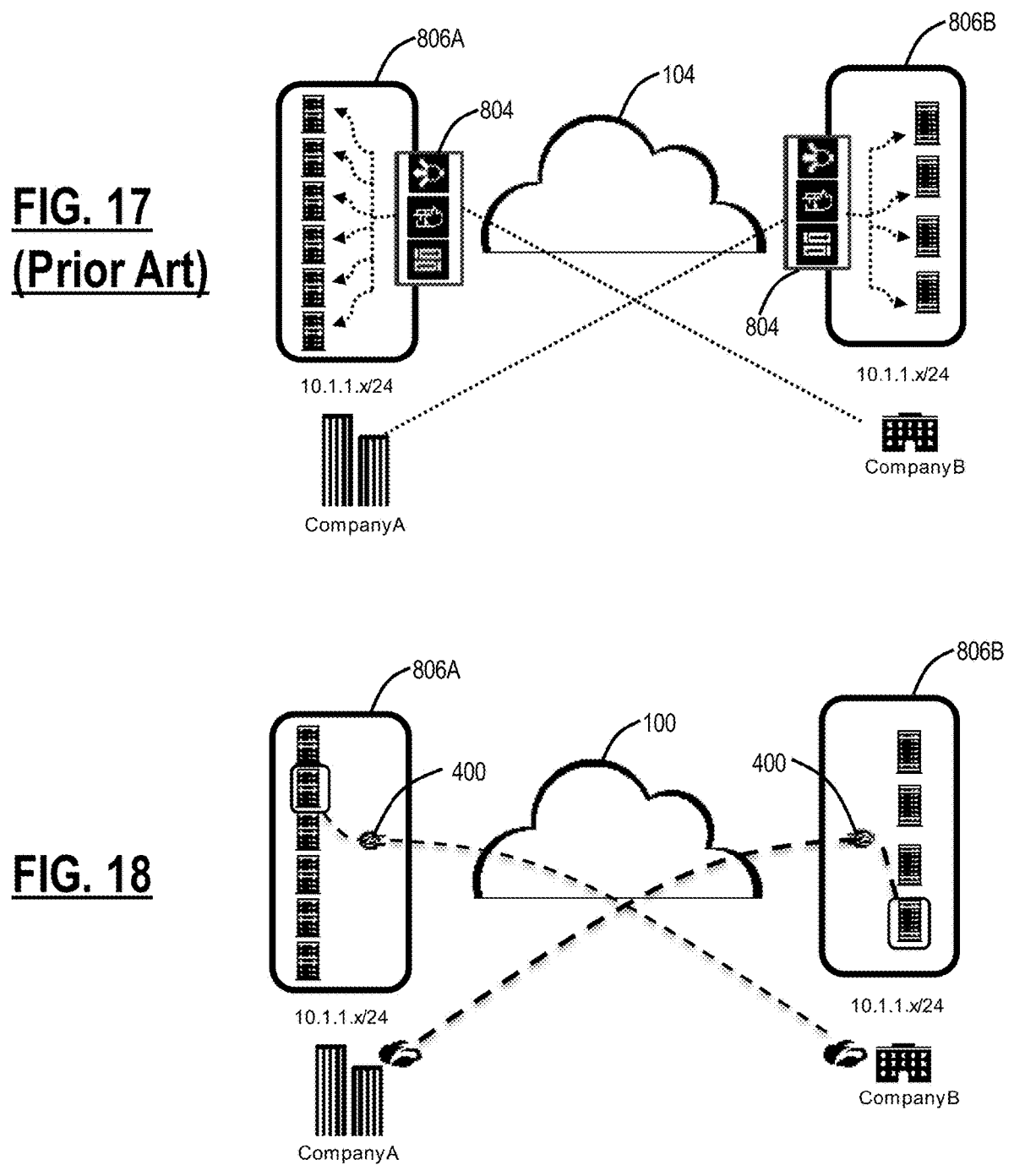

FIGS. 17 and 18 are network diagrams of a conventional network setup to share data between two companies (FIG. 17) such as for Merger and Acquisition (M&A) purposes or the like, compared to a network setup using virtual private access (FIG. 18). Conventionally, the two companies provide VPN connections between their associated enterprise networks 806A, 806B to one another. Each company gets "all or nothing"—no per-application granularity. Disadvantageously, creating Access Control Lists (ACLs)/firewall rules and NATting through each companies' respective firewalls is very complex, particularly with overlapping internal IP addressing. In FIG. 18, the virtual private access allows connections provisioned by the user and device to the application by name, not by IP address, authorized users can access only specific applications, not an entire network, and firewall complexities disappear.

Administrative View of Virtual Private Access

Figure 19:
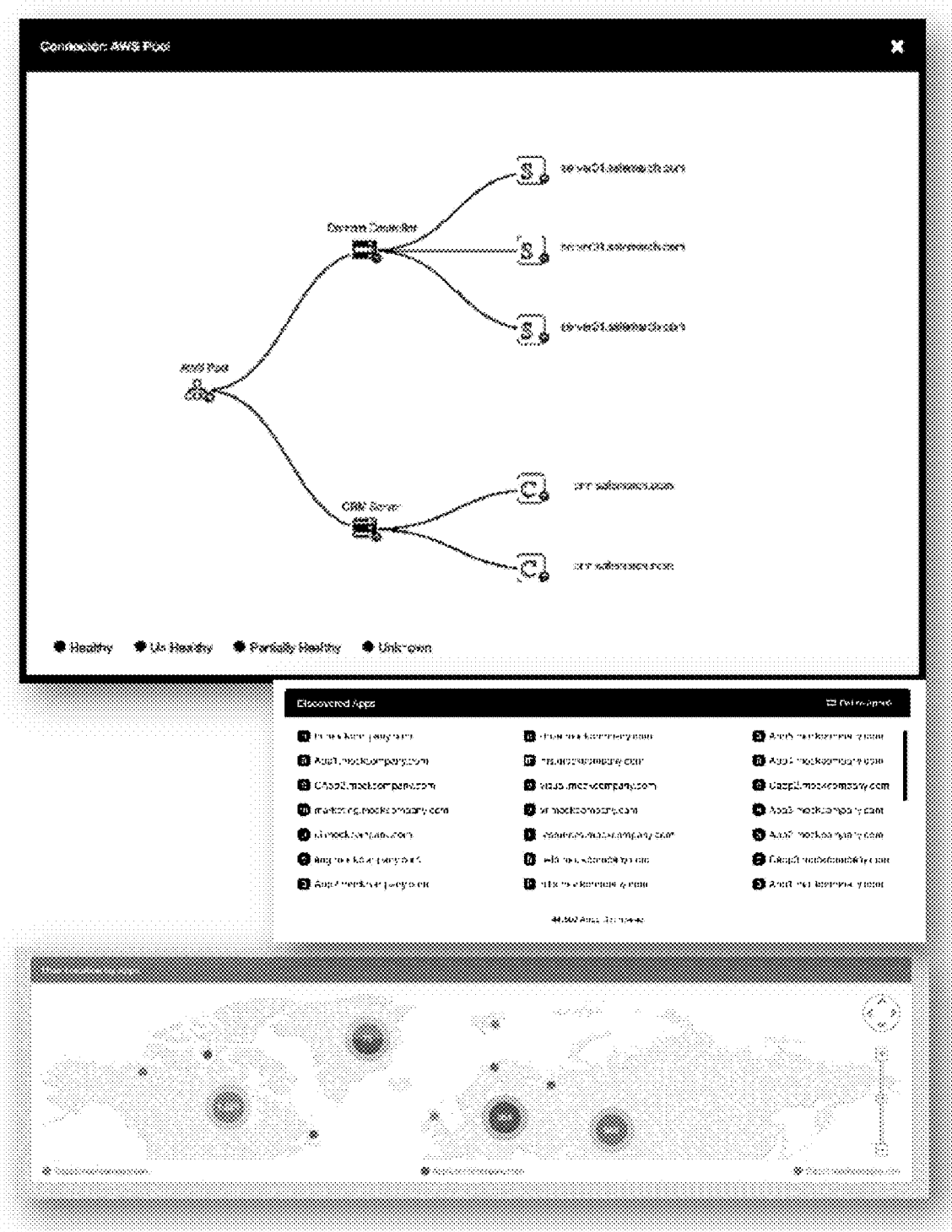
FIGS. 19 and 20 are screenshots of Graphical User Interfaces (GUIs) for administrator access to the virtual private access with FIG. 19 illustrating a GUI of network auto-discovery and FIG. 20 illustrating a GUI for reporting.
Figure 20:
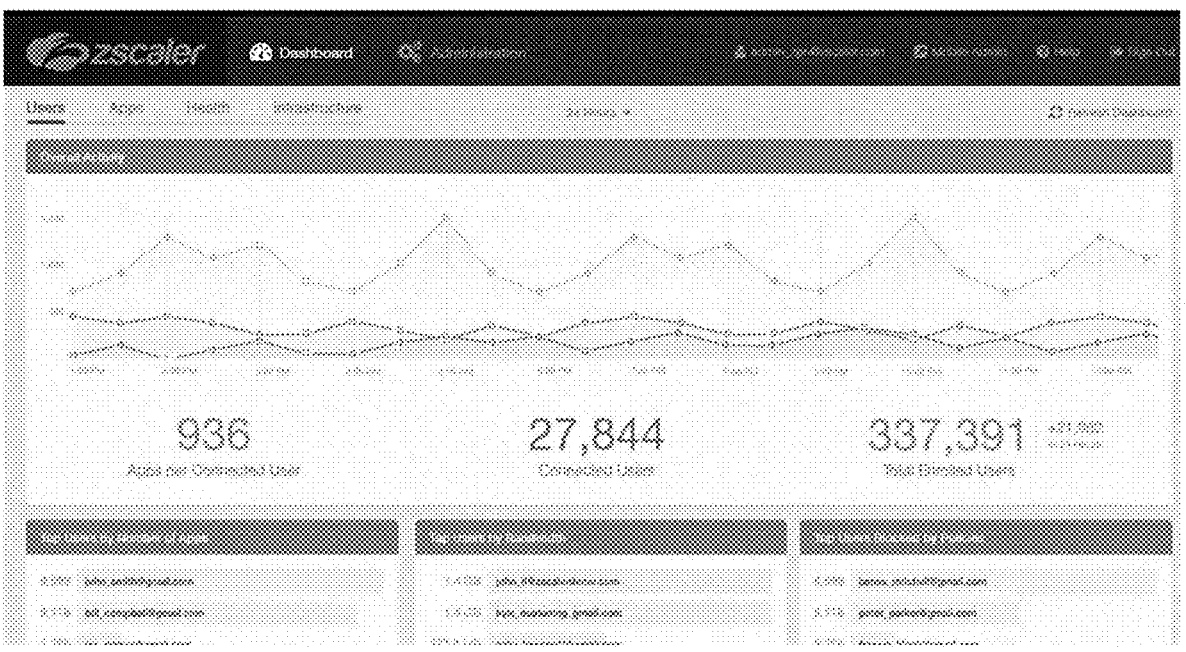

FIGS. 19 and 20 are screenshots of Graphical User Interfaces (GUIs) for administrator access to the virtual private access. FIG. 19 illustrates a GUI of network auto-discovery and FIG. 20 illustrates a GUI for reporting. For network and application discovery, the virtual private access can use wildcard application discovery where a Domain/name-based query to the lightweight connector 400 will show company applications behind them. This allows the discovery of internal applications as users request them using "*.company.com" to find applications. Then, the granular policy can be built around the applications to dramatically simply startup. Further, the virtual private access can show the location of users that are accessing private/internal applications, including identifying anomalous access patterns to assist in stopping possible data leakage or compliance violation.

Virtual Private Access

In an embodiment, a virtual private access method implemented by a cloud-based system, includes receiving a request to access resources from a user device, wherein the resources are located in one of a public cloud and an enterprise network and the user device is remote therefrom on the Internet; forwarding the request to a central authority for a policy look up and for a determination of connection information to make an associated secure connection through the cloud-based system to the resources; receiving the connection information from the central authority responsive to an authorized policy look up; and creating secure tunnels between the user device and the resources based on the connection information. Prior to the receiving, a user executes an application on the user device, provides authentication, and provides the request with the application operating on the user device. The application can be configured to connect the user device to the cloud-based system, via an optimized cloud node based on a location of the user device. The resources can be communicatively coupled to a lightweight connector operating on a computer and communicatively coupled between the resources and the cloud-based system. The virtual private access method can further include detecting the resources based on a query to the lightweight connector. The lightweight connector can be prevented from accepting inbound connections, thereby preventing access of the resources external from the public cloud or the enterprise network. The creating secure tunnels can include creating connections between one or more cloud nodes in the cloud-based system, wherein the one or more cloud nodes do not participate in a key exchange, and the one or more cloud nodes do not have data access to traffic on the secure tunnels. The creating secure tunnels can include creating connections between one or more cloud nodes in the cloud-based system, wherein the one or more cloud nodes create the secure tunnels based on a combination of a client-side certificate and a server-side certificate. The secure tunnels can be created through software on the user device, the cloud-based system, and a lightweight connector operating on a computer associated with the resources, thereby eliminating dedicated hardware for virtual private network connections.

In another embodiment, a cloud-based system adapted to implement virtual private access includes one or more cloud nodes communicatively coupled to one another; wherein each of the one or more cloud nodes includes one or more processors and memory storing instructions that, when executed, cause the one or more processors to receive a request to access resources from a user device, wherein the resources are located in one of a public cloud and an enterprise network and the user device is remote therefrom on the Internet; forward the request to a central authority for a policy look up and for a determination of connection information to make an associated secure connection through the cloud-based system to the resources; receive the connection information from the central authority responsive to an authorized policy look up; and create secure tunnels between the user device and the resources based on the connection information. Prior to reception of the request, a user executes an application on the user device, provides authentication, and provides the request with the application operating on the user device. The application can be configured to connect the user device to the cloud-based system, via an optimized cloud node based on a location of the user device. The resources can be communicatively coupled to a lightweight connector operating on a computer and communicatively coupled between the resources and the cloud-based system. The memory storing instructions that, when executed, can further cause the one or more processors to detect the resources based on a query to the lightweight connector. The lightweight connector can be prevented from accepting inbound connections, thereby preventing access of the resources external from the public cloud or the enterprise network. The secure tunnels can be created through connections between one or more cloud nodes in the cloud-based system, wherein the one or more cloud nodes do not participate in a key exchange, and the one or more cloud nodes do not have data access to traffic on the secure tunnels. The secure tunnels can be created through connections between one or more cloud nodes in the cloud-based system, wherein the one or more cloud nodes create the secure tunnels based on a combination of a client-side certificate and a server-side certificate. The secure tunnels can be created through software on the user device, the cloud-based system, and a lightweight connector operating on a computer associated with the resources, thereby eliminating dedicated hardware for virtual private network connections.

Software stored in a non-transitory computer readable medium including instructions executable by a system, which in response to such execution causes the system to perform operations including receiving a request to access resources from a user device, wherein the resources are located in one of a public cloud and an enterprise network and the user device is remote therefrom on the Internet; forwarding the request to a central authority for a policy look up and for a determination of connection information to make an associated secure connection through the cloud-based system to the resources; receiving the connection information from the central authority responsive to an authorized policy look up; and creating secure tunnels between the user device and the resources based on the connection information. The resources can be communicatively coupled to a lightweight connector operating on a computer and communicatively coupled between the resources and the cloud-based system, and wherein the instructions executable by the system, which in response to such execution can further cause the system to perform operations including detecting the resources based on a query to the lightweight connector.

VPN in the Cloud

In an embodiment, a method includes connecting to a client at a Virtual Private Network (VPN) device in a cloud-based system; forwarding requests from the client for the Internet or public clouds accordingly; and for requests for an enterprise associated with the client, contacting a topology controller to fetch a topology of the enterprise, causing a tunnel to be established from the enterprise to the VPN device, and forwarding the requests for the enterprise through the tunnel to the cloud-based system for proactive monitoring; and providing a secure connection from the cloud-based system back to the enterprise, including internal domain and subnets associated with the enterprise. The method can further include authenticating, via an authentication server, the client prior to the connecting and associated the client with the enterprise. The method can further include, subsequent to the connecting, setting a Domain Name Server (DNS) associated with the cloud-based system to provide DNS lookups for the client. The method can further include utilizing the DNS to determine a destination of the requests; and, for the requests for the enterprise, contacting the topology controller to pre-fetch the topology of the enterprise. The method can further include operating an on-premises redirection proxy within the enterprise, wherein the on-premises redirection proxy is configured to establish the tunnel from the enterprise to the VPN device. Secure tunnels to the enterprise are dialed out from the enterprise by the on-premises redirection proxy. The on-premises redirection proxy is a virtual machine operating behind a firewall associated with the enterprise. The on-premises redirection proxy is configured as a bridge between the client and applications inside the enterprise. The VPN device operates on a cloud node in the cloud-based system, and wherein the cloud-based system includes a distributed security cloud. The VPN device can include one of a software instance on a cloud node or a virtual machine on the cloud node. The topology controller includes a network topology of the enterprise, including internal domain names and subnets.

In another embodiment, a cloud-based system includes one or more Virtual Private Network (VPN) servers, wherein one or more clients connect securely to the one or more VPN servers; a topology controller communicatively coupled to the one or more VPN servers; a Domain Name Server (DNS) communicatively coupled to the topology controller and the one or more VPN servers; and a redirection proxy located in a private network and communicatively coupled to the one or more VPN servers and the topology controller; wherein requests from the one or more clients to the private network cause on demand secure connections being established by the redirection proxy to associated VPN servers in a cloud-based system, wherein the on demand secure connections provide connectivity to the private network including internal domain and subnets associated with the private network, and wherein the cloud-based system performs proactive monitoring. Requests from the one or more clients outside of the private network are forwarded without traversing the private network. The redirection proxy maintains a persistent connection to the topology controller and establishes secure tunnels to the one or more VPN servers based on direction from the topology controller. The topology controller includes a network topology of the private network, including internal domain names and subnets. The VPN servers operate on cloud nodes in a distributed security cloud.

In yet another embodiment, a VPN system includes a network interface, a data store, and a processor, each communicatively coupled together; and memory storing instructions that, when executed, cause the processor to establish a secure tunnel with a client; forward requests from the client to the Internet accordingly; and for requests to an enterprise, contact a topology controller to fetch a topology of the enterprise, cause a tunnel to be established from the enterprise to the VPN system, and forwarding the requests for the enterprise through the tunnel and the secure tunnel, wherein the secure tunnel is achieved by using an on-demand dial-out and tunneling traffic authentication. The memory storing instructions that, when executed, further cause the processor to cause the tunnel to be established from the enterprise to the VPN system through an on premises redirection proxy located within the enterprise.

Browser Isolation

Browser (web) isolation is a technique where a user's browser or apps are physically isolated away from the user device, the local network, etc. thereby removing the risks of malicious code, malware, cyberattacks, etc. This has been shown to be an effective technique for enterprises to reduce attacks. Techniques for browser isolation are described in commonly-assigned U.S. patent application Ser. No. 16/702,889, filed Dec. 4, 2019, and entitled "Cloud-based web content processing system providing client threat isolation and data integrity," the contents of which are incorporated by reference herein. Traditionally browser isolation was focused on removing the risks of malicious code, malware, cyberattacks, etc. U.S. patent application Ser. No. 16/702,889 describes an additional use case of preventing data exfiltration. That is, because no data is delivered to the local system (e.g., to be processed by web content through the local web browser), none of the confidential or otherwise sensitive data can be retained on the local system.

The secure access can interoperate with browser isolation through the cloud-based system 100, to prevent data exfiltration, which is extremely critical as this is customer-facing data which adds to the sensitivity and liability, and also accessible to external users (customers). This functionality forces customers to interact with the B2B applications via an isolated, contained environment.

Private Service Edge in a Cloud-Based System

Figures 21, 22:
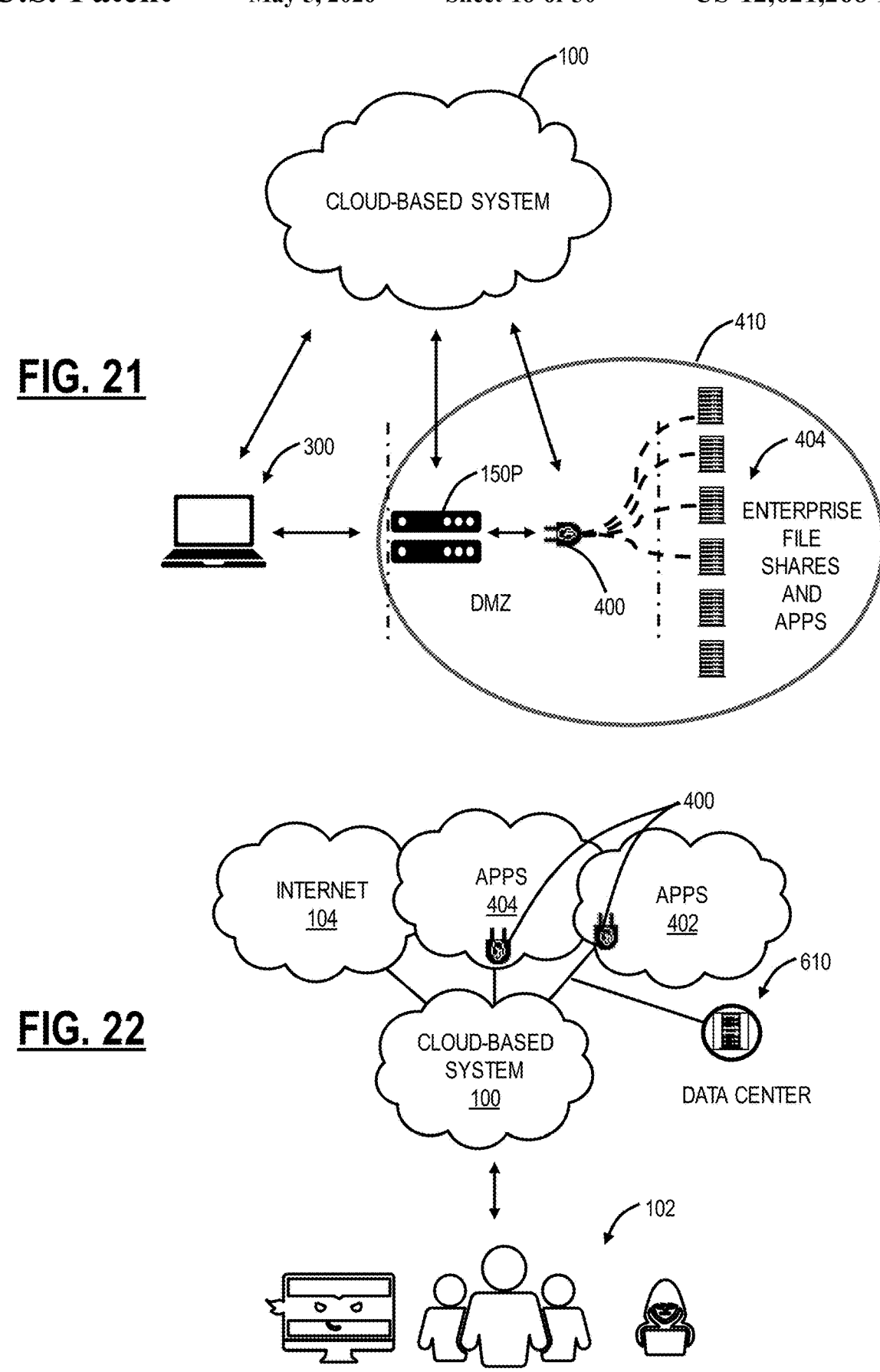
FIG. 21 is a network diagram of the cloud-based system with a private service edge node in an enterprise network.
FIG. 22 is a network diagram illustrating the cloud-based system with private applications and data centers connected thereto to provide virtual private access through the cloud-based system along with different types of users, namely trusted and untrusted users.

FIG. 21 is a network diagram of the cloud-based system 100 with a private service edge node 150P in the enterprise network 410. The private service edge node 150P is similar to the enforcement nodes 150 (i.e., public service edge nodes) except located in the enterprise network 410. For private application access, the service edge node 150P can be a broker that is hosted by the enterprise, but managed with the cloud-based system 100. As described herein, a broker is configured to create the tunnels between the user device 300 and the connector 400, and the broker is an intermediate device. The service edge node 150P is designed as a single-tenant (per customer) instance, is configured to operate with the cloud-based system 100 including downloading policies and configuration, is configured to broker connections between the connector application 350 and the connector 400, is configured to enforce policies and cache path selection decisions, etc.

When a user 102 with the user device 300 is located on the enterprise network 410, the traffic between the user 102 and the applications 404 stay on the enterprise network 410 and consistent policies are applied for on-premise and remote. The private service edge node 150P can be located in a branch office, in a central office with tunnels to branch offices, etc. Of note, the private service edge node 150P is located with the applications 404 and the connector 400 and this proximity reduces latency.

The private service edge node 150P can be hosted in a public cloud, on-site as a Virtual Machine (VM), in a container, on physical servers, etc. The private service edge node 150P is publicly accessible such as via an IP address; the connector 400 is not publicly accessible—it dials out. The private service edge node 150P can include listen IP addresses and publish IP addresses or domains. The listen IP addresses are a set of IP addresses that the private service edge node 150P uses for accepting incoming connections, and this can be specified or all IP addresses. The publish IP addresses or domains, if specified, are required for connection to the private service edge node 150P. If these are specified, one of the entries is provided to the applications 350, e.g., randomly selected.

Private Access

FIG. 22 is a network diagram illustrating the cloud-based system 100 with private applications 402, 404 and data centers 610 connected thereto to provide virtual private access through the cloud-based system 100 along with different types of users 102, namely trusted and untrusted users. The ZTNA approach described herein provides virtual private access connecting authenticated users 102 to the applications 402, 404 after authorization and providing strong connection integrity with end-to-end encryption. However, tenants (organizations) do not implicitly trust the end user 102 or end user devices 300.

The following table illustrates example user 102 and user device 300 scenarios.

| User | Device | Trusted User | Trusted Device | Connection |
|---|---|---|---|---|
| Employee | Personal tablet | Y | N | Trusted user. Untrusted device. |
| Employee - on a notice period | Corporate laptop | N | Y | Untrusted user. Trusted device. |
| Third Party Contractors | Corporate laptop | N | Y | Third-party user. Trusted device. |
| Third Party Contractors | Non-corporate laptop | N | N | Third-party user. Untrusted device. |

With private application access, only an authenticated user can access the applications 402, 404; unauthenticated users see that the applications 402, 404 do not exist. However, an authenticated user can be an untrusted user or on an untrusted device. The security concerns with an untrusted user include access to sensitive information by query manipulation via web form; performing function elevation by URL manipulation; gaining access to internal resources via web server; etc. For example, an untrusted user can guess passwords of various accounts successfully, such as default/ empty username and passwords (password spraying), stolen credentials for internal apps (credential stuffing), test default service accounts credentials, scripted login attempts (BOT), etc.

The security concerns with an untrusted device include the user's browser executes scripts and sends the user's cookie to the attacker's server, e.g., XSS, Cookie stealing; can case Denial of Service (DoS) on target application (not DDoS), e.g., user's browser initiates large number of connection requests to target application, scripted traffic overwhelms applications (BOT); and can copy of sensitive data on a non-corporate device.

WAAP

Figures 23, 24:
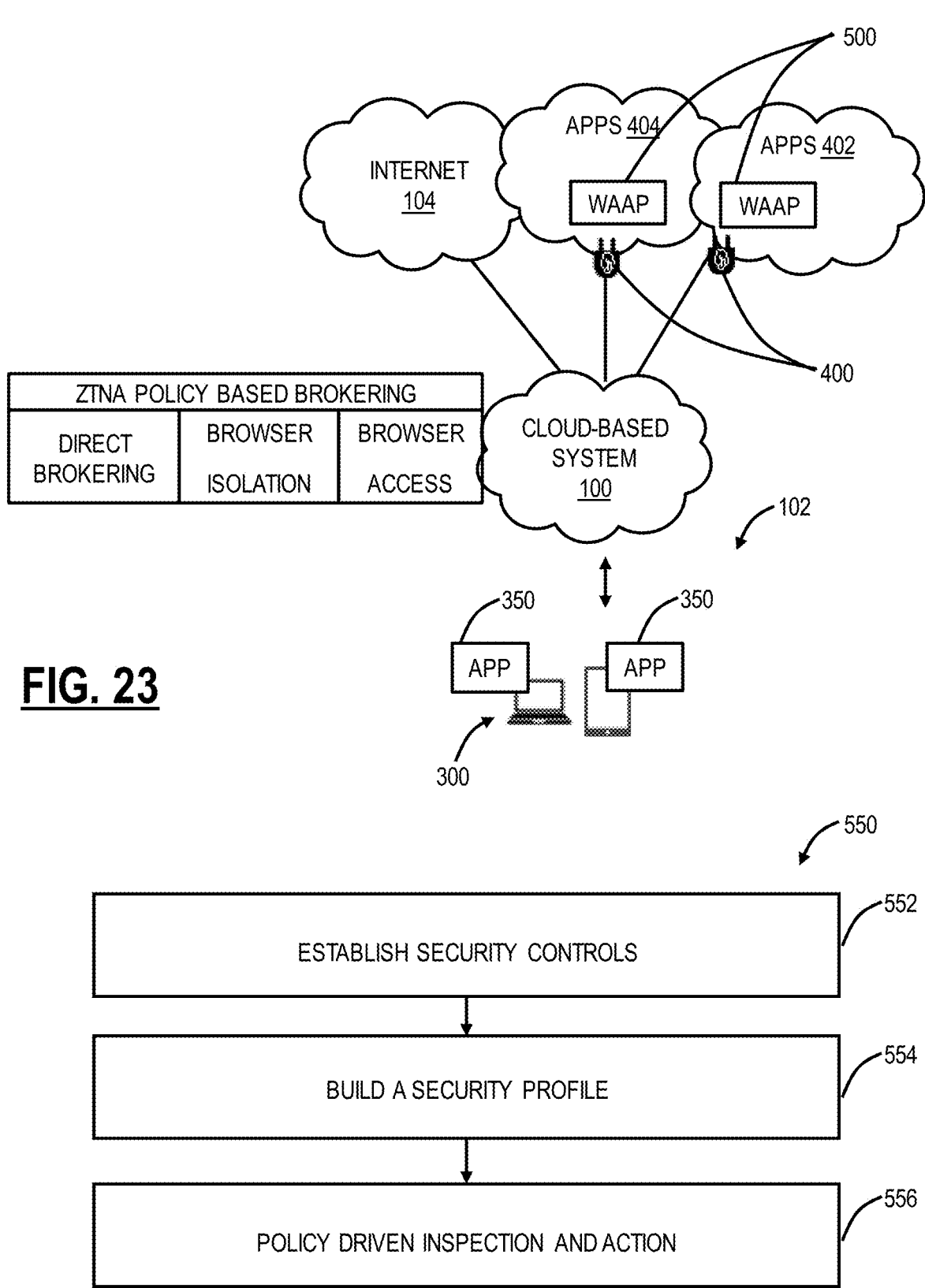
FIG. 23 is a network diagram illustrating the cloud-based system with private applications connected thereto to provide virtual private access through the cloud-based system via the connectors and with a WAAP between the connectors and the applications.
FIG. 24 is a flowchart of a WAAP inspection process for inspection with the private access.

FIG. 23 is a network diagram illustrating the cloud-based system 100 with private applications 402, 404 connected thereto to provide virtual private access through the cloud-based system via the connectors 400 and with a WAAP 600 between the connectors 400 and the applications 402, 404. The present disclosure includes a WAAP function in between the applications 402, 404 and the connector 400. The WAAP 600 is configured to extend the connector 400 to provide a web application protection stack and provides integrated inspection functionality. The WAAP 600 operates after access control, via the connector 400. There is a dedicated WAAP dashboard and log feeds, such as through the cloud-based system 100. The WAAP 600 works with the various ways for accessing the private applications, such as via the connector application 350, such as through a browser, and through browser isolation.

The core functionality of the WAAP 600 includes OAWSP rule coverage, custom and standard HTTP header inspection, and multiple operation modes. The HTTP header inspection includes write-your-own signatures, regular expressions are supported, and logical operations are supported. The multiple modes of operation can include monitor-only, block mode, and redirect. The objective of the WAAP 600 is to protect the applications 402, 404 from compromised user devices 300 as well as from untrusted users 102.

FIG. 24 is a flowchart of a WAAP inspection process 650 for inspection with the private access. The WAAP inspection process 650 is implemented via the WAAP 600 and through the cloud-based system 100. The WAAP inspection process 650 includes establishing security controls (step 652), building a security profile (step 654), and performing policy driven inspection and action (step 656).

Figure 25:
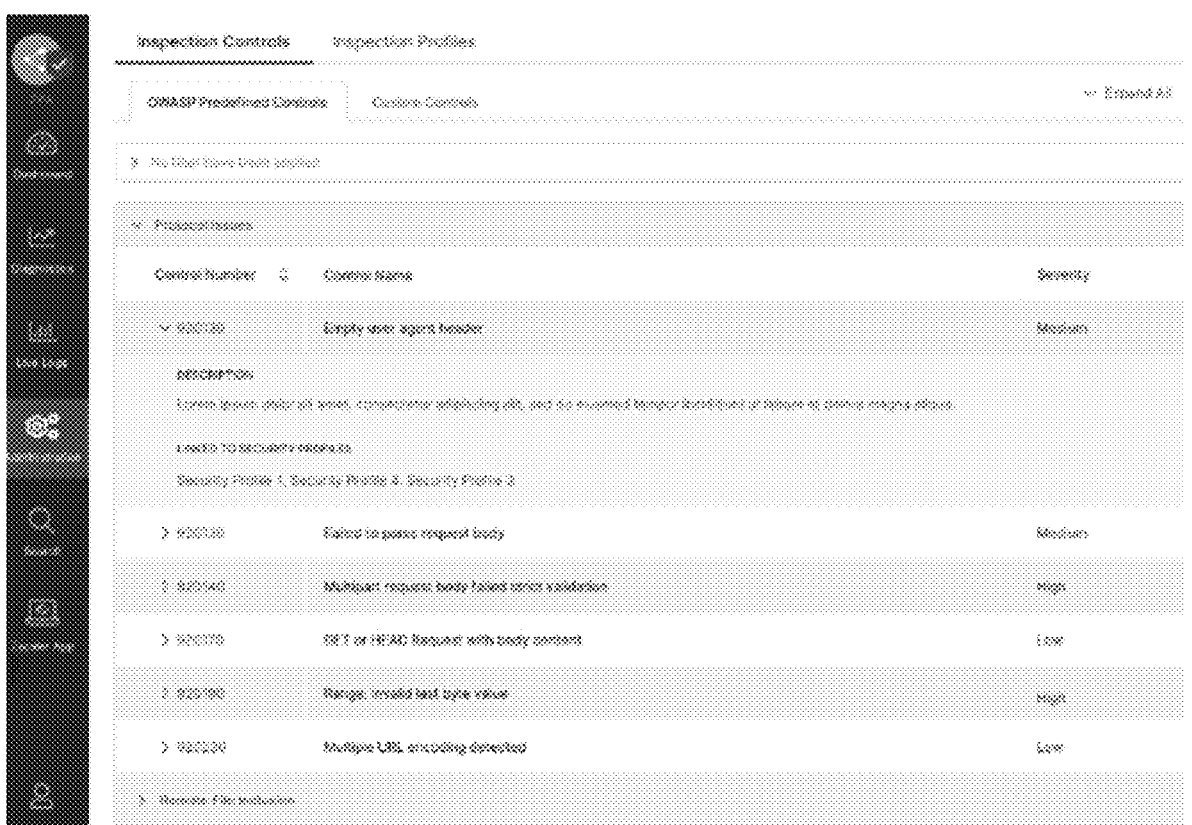
FIG. 25 is a dashboard of an example of inspection controls and FIG. 26 is a pop-up for a user to create a custom control.
Figure 26:
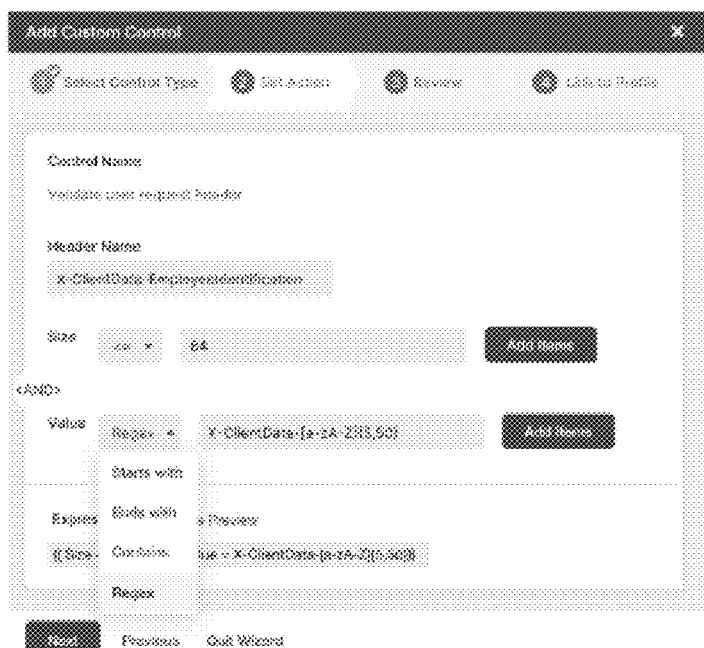

The establishing security controls can be via a dashboard to an admin, via the cloud-based system, where there is a repository of predefined controls as well as opportunities to write your own controls. The predefined controls can be OWASP rules. FIG. 25 is a dashboard of an example of inspection controls and FIG. 26 is a pop-up for a user to create a custom control.

Figure 27:
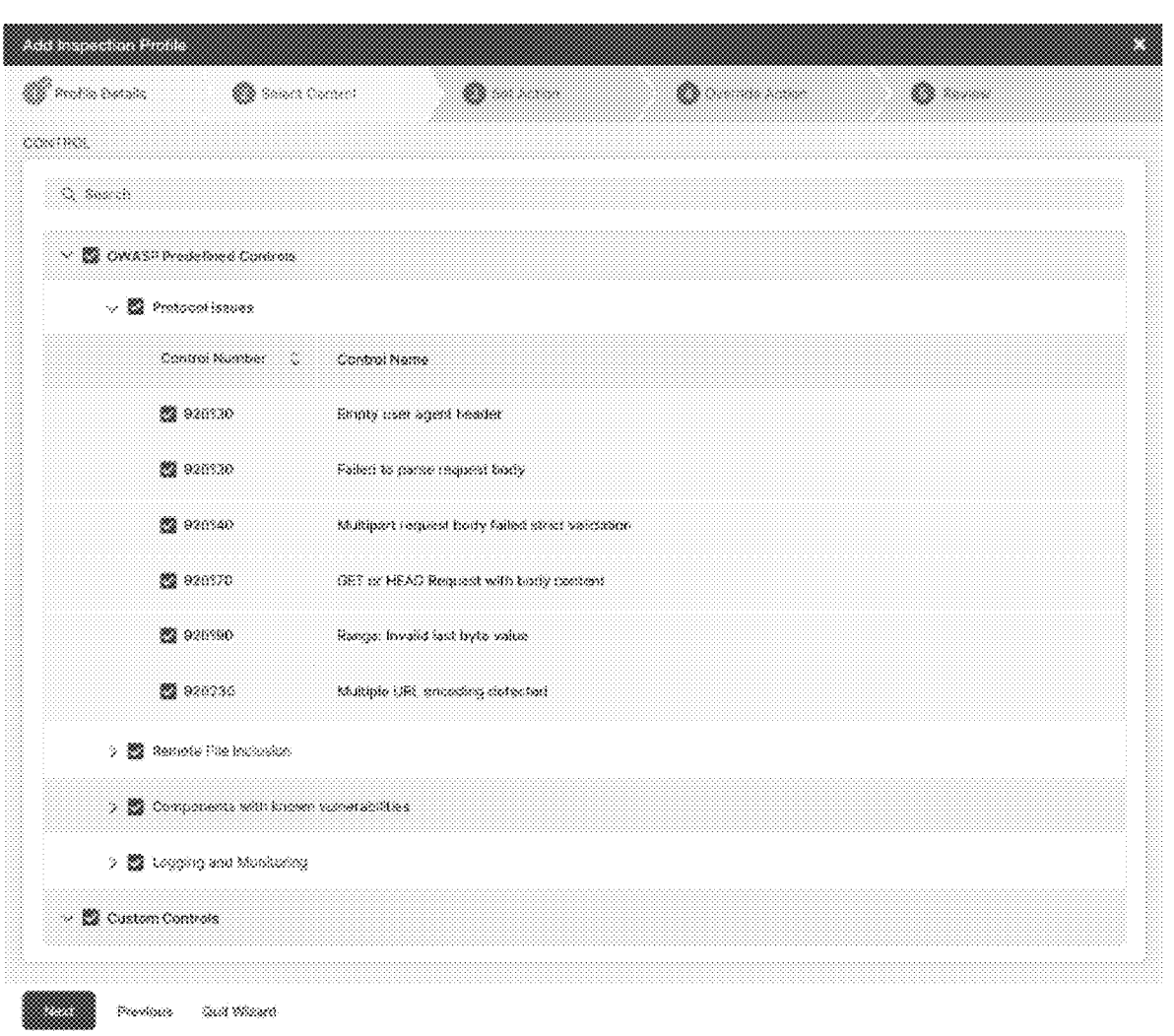
FIGS. 27 and 28 are dashboards of an example of inspection policy.
Figure 28:
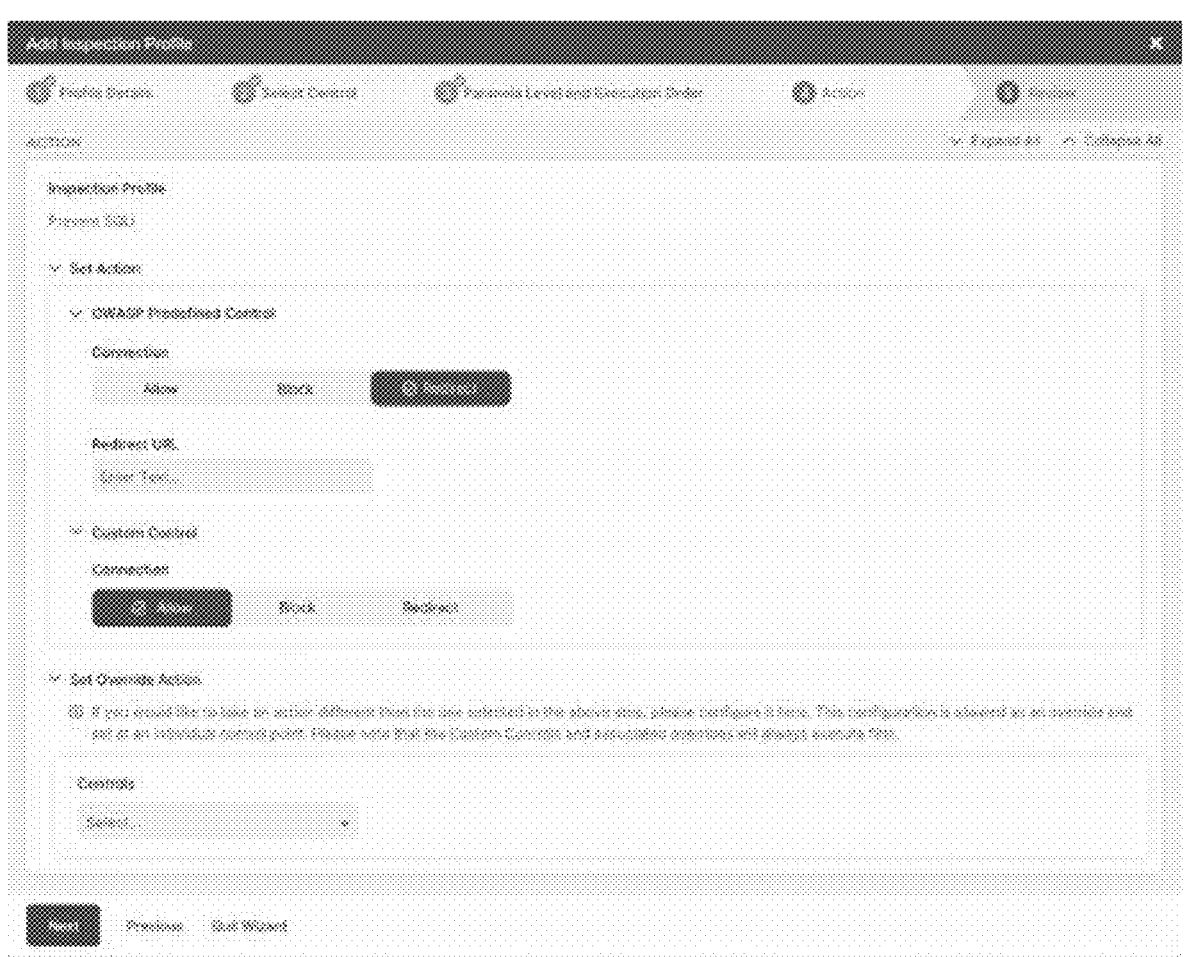

The building a security profile can also be via the dashboard. There can be inspection controls and inspection profiles. The inspection controls are the rules—custom or predefined. The inspection profiles are collections of the rules, an order or rank of rule importance, common or control specific actions, overrides, etc. That is, the inspection controls are general rules. The inspection profiles are applications of specific rules granular on a per application 402, 404 basis, per tenant and per user basis. FIGS. 27 and 28 are dashboards of an example of inspection policy.

Figure 29:
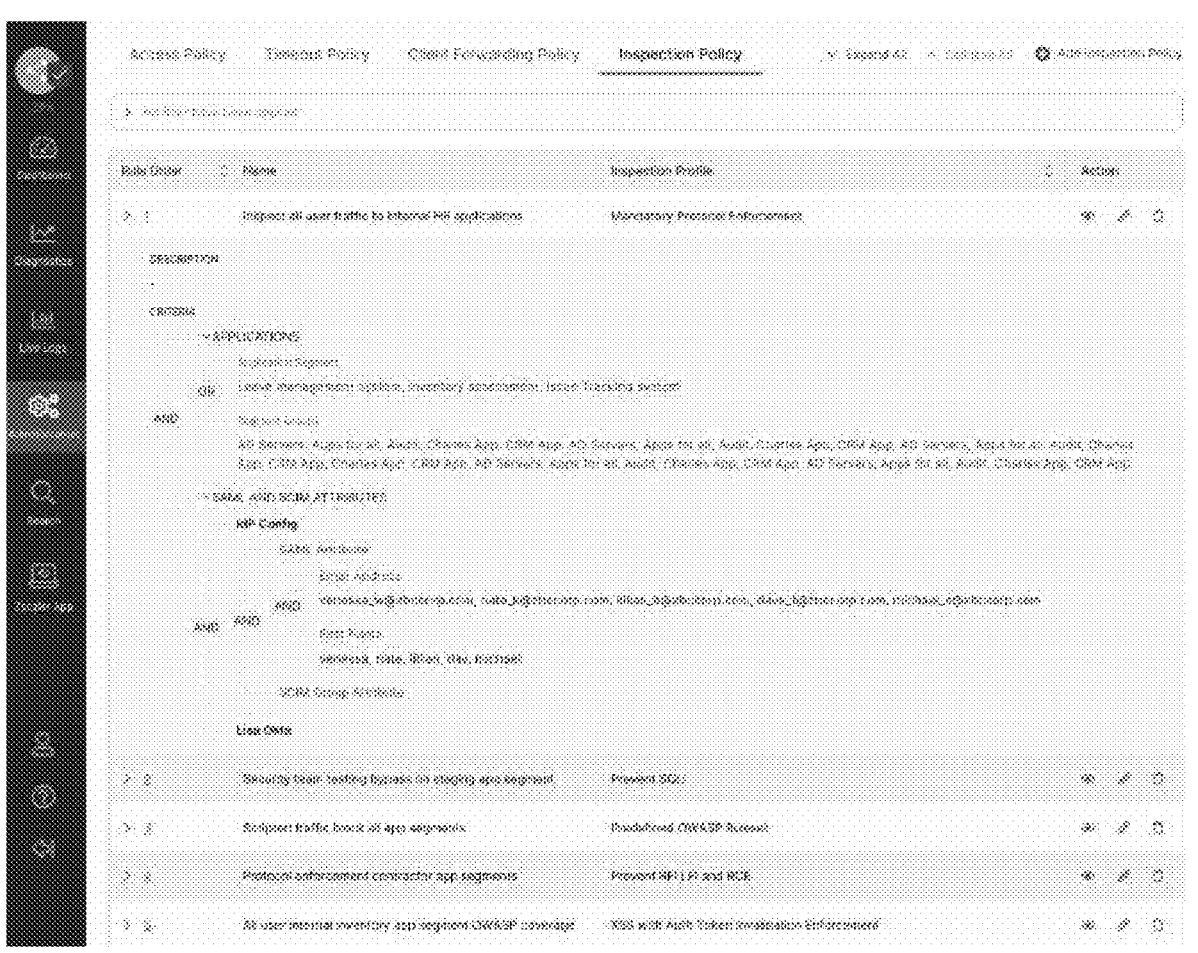
FIG. 29 is a dashboard for inspection policy.
Figure 30:
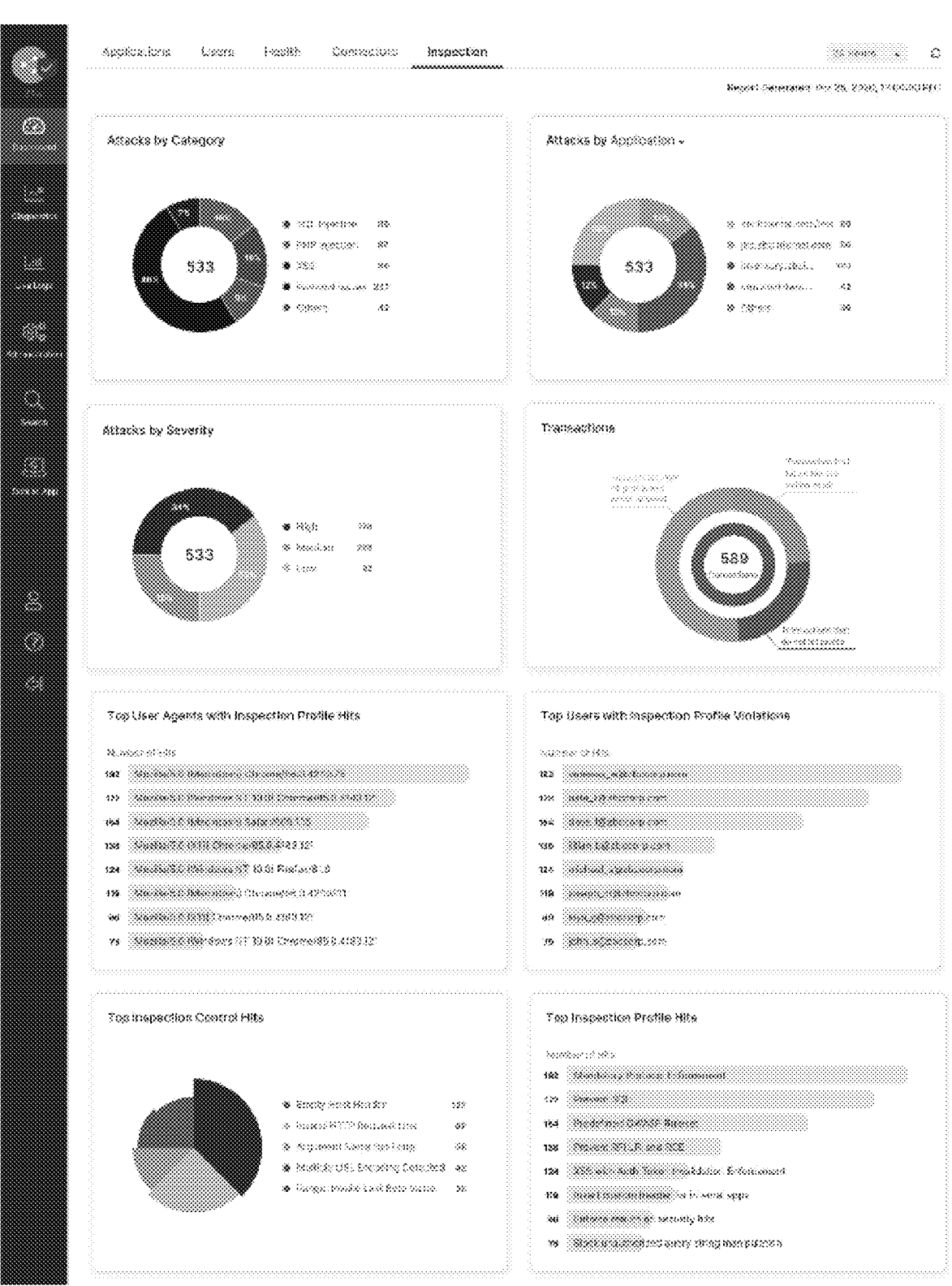
FIG. 30 is a dashboard of WAAP activity based on the inspection profiles.

Finally, the WAAP 600 implements policy driven inspection and action. This includes granular, criteria-based inspection, adding a policy model to private application access and applying a security profile based on criteria. FIG. 29 is a dashboard for inspection policy. The inspection includes OWASP Top 10 coverage, Standard and Custom HTTP Header Inspection, API parameter extraction and inspection, URL & response header rewrites, Connection rate limiting, Identifying scripted/bot traffic vs real user traffic, and the like. FIG. 30 is a dashboard of WAAP activity based on the inspection profiles.

OWASP Top 10 Coverage

The WAAP 600 can support the OWASP top 10 attacks including injection attacks (SQL, command, etc.), broken authentication, broken access control, Cross-Site Scripting (XSS), insecure deserialization, XML External Entities (XEE), data exposure, security misconfiguration, components with known vulnerabilities, and insufficient logging and monitoring. Also, the WAAP 600 can support other signatures. The WAAP 600 can support predefined signatures, e.g., the OWASP top 10, customer-driven signatures, e.g., write your own controls, and future predefined signatures.

WAAP Capabilities

Anomaly Detection a. HTTP protocol anomalies, such as missing host user-agent and accept headers b. HTTP request smuggling c. HTTP response splitting d. HTTP protocol violations e. Protection against crawlers and scanners Bot Management a. Bot mitigation ruleset b. Consideration for Authorized Bots per application API Security DoS Protection a. Large number of connection requests to target application b. The cloud-based system 100 infrastructure scales but target application does not c. Scripted traffic overwhelms applications (BOT)

Rule Based Controls a. Configurable request size limits with lower and upper bounds b. Exclusion lists let you omit certain request attributes from a Web Application Firewall (WAF) evaluation. A common example is Active Directory-inserted tokens that are used for authentication or password fields.

c. Geo-filter traffic to allow or block certain countries/ regions from gaining access to applications Programmatic deployment, monitoring & maintenance in dynamic web app and microservices environments Use Cases UC1: OWASP Top-10 Inspection and Visibility—Provide visibility into user traffic going to my internal applications. What type of attacks are targeted to internal web applications. OWASP Top-10 coverage is the most basic. Show how apps are evaluating against OWASP Top-10.

UC2: Prevent malicious data upload to internal applications—Prevent malware upload to applications behind the connector 400. Monitor if untrusted user is doing sensitive data download and block such attempts by users.

UC3: Ease of configuration for native private application controls—Reduce burden on my admins to configure application security rules.

UC4: Monitor for potentially malicious application and user behavior—Provide visibility into unexpected application or user behavior including APIs. Too many errors, too many open connections, unexpected crashes, unexpected resource requests etc. Anything unusual that can potentially indicate that it is not a typical user-application interaction.

UC5: HTTP header and content rewrite—Rewrite content. Applications and access built assuming reverse-proxy solution. Rewrite headers to make sure that applications do not break with native security controls and apps do not see unexpected out of bound values.

UC6: SQL Injection/signature based attacks—Web applications sending untrusted data to an interpreter in construction of SQL calls can be exploited by modifying parameter values in the browser to execute commands such as fetching additional data, invoking SPs, deletion of records etc. Prevalent in legacy code. Untrusted users can access potentially sensitive data by exploiting such vulnerabilities.

UC7: Broken Authentication/Session Management—The session ID or token binds the user authentication credentials (in the form of a user session) to the user HTTP traffic and the appropriate access controls enforced by the web application. Typical session hijacking that involves brute force, non-random session ID calculation, cookie hijacking.

UC8: External Entity Processing (XXE)—A weakly configured XML parser can process XML input containing a reference to an external entity. Attackers can execute DoS, cause exposure of confidential data, disclosure of local files etc. Attacker may pivot to other internal systems since XXE occurs relative to the app processing XML doc. This can lead to CSRF attack.

UC9: Application Configuration Vulnerabilities—Unnecessary ports, service, account and privilege configurations have the potential to increase attack surface. Also, default accounts and passwords make applications more susceptible to attacks. Detection of common application misconfigurations is a must to have capability of a WAF.

UC10: User gains access to privileged resources—A user gains access to sensitive information by query manipulation via web form (*.*/empty parameters) or performs function elevation by URL manipulation app1.mycompany.com/order/home.jsp?role=3

UC11: Malicious script stored on web server and executed on every user call (Stored XSS)—Typical precursor to this is the malicious script being sent through unvalidated vulnerable input. Once saved in database, the script will be executed on functions such as page load. Also used as one of the common ways to steal user cookies.

UC12: Custom HTTP Headers & Response—Custom HTTP headers are used sometimes to implement particular logic on the server side. It is important to inspect custom headers to make sure that the values are within acceptable bounds. Even if an application throws errors or causes unexpected behavior, do not communicate the error codes back to the user. This might help an untrusted user to cause more unintended behavior on application. Customize the responses being sent.

UC13: Insecure Deserialization—Common attack vector for API, Microservices and client side MVC causing arbitrary remote code execution. Attackers exploited this in a vulnerable Equifax web app during the 2017 data breach.

UC14: Zeroaccess Reporting—In a Zeroaccess attack, a single attacker must normally establish hundreds of RPC connections. We have no idea how many attackers we might be facing as we have a single IP address that aggregates a large number of systems.

UC15: Brute force, credential stuffing and overwhelming application A user may able to brute force values for hidden fields or preset query string parametersappl.mycompany-.com/employee-internal/homejsp?adminRank=9. Lack of access control over privileged functions within an internal web application is common. It may allow privilege escalation once a user is authenticated.

WAAP Features

The following tables illustrates features and functions of the WAAP 600.

| Term | Description |
| --- | --- |
| Inspection Control/ Control Point | Smallest unit of execution. A predefined or custom defined control. Example - Predefined "control #920140 - Multipart request body failed strict validation" Example - Custom "user request header match pattern" |
| Inspection Profile | Container for selected predefined or custom controls Admin can rank sections (predefined/custom) within a security profile Admin can set of common or control specific actions within a security profile |
| Inspection Rule | Granular criteria-based rule. Rule criteria same as access criteria. Action is "apply selected Security Profile" |
| Inspection Policy | Container for all security rules There is only one security policy Rules are executed in the order they are ranked by Admin |
| Violation | Violation of a rule/control is evaluated, and it results in taking any of the defined actions - monitor, allow, block, redirect Hit is a rule/control is evaluated and it does not result in taking any action. |

Firewall Rules

A firewall policy (or rule) is an exact description of what the firewall is supposed to do with particular traffic. When enabled, the firewall always have at least one active rule, although usually multiple rules are employed to differentiate traffic varieties by {source, destination, and application} and treat them differently. In general, firewall policy consists of matching criteria, an action, and some attributes:

> rule_rank rule_label [who] [from] [to] [network service] [network application] [when] action [action restrictions] [rule status] [logging]

The firewall supports a policy construct, to determine where firewall policy is enforced during an overall order of operation of packet flow through the cloud node 502. In an embodiment, there are three types of policy, namely, firewall policy, NAT policy, and DNS policy.

The firewall policy construct supports a rule order, status, criteria, and action. Policies are matched in the rule order in which they were defined. The status is enabled or disabled. The matching criteria can include the following:

> From Location, Department, Group, IP Address, IP Address Group, IP address Ranges, User, and/or User Group
>
> To IP address, Address Group, Domain Name or countries
>
> Firewall service(s) L4 services as listed above, and new services may be defined by Source IP, Destination IP, Source Port, Destination Port, and Protocol
>
> Firewall application(s) L7 application supported by a Deep Packet Inspection (DPI) engine
>
> When Schedule
>
> Daily quota Time or bandwidth, allowing the user to configure the amount of time or bandwidth a user is allowed for a certain application.
>
> Action Allow or block by either dropping traffic or by sending TCP reset All components of the matching criteria are optional and if skipped imply "any." A session matches a rule when all matching criteria components of the rule are satisfied (TRUE) by the session. If a session matches any element of a component (i.e., one of the IPs in a group), then the entire component is matched.

Maintaining Dependencies in a Set of Rules

In an embodiment, the WAAP 600 includes saving rules in a database whilst maintaining any ordering and dependencies that exist between the different rules. This rule and dependency approach can also be used with any other type of cloud-based or non-cloud security system that applies rules with dependencies, including, without limitation, WAF, DPI, DLP, WAAP, IPS, etc.

To enable the storing of security rules and distributing them in the cloud-based system 100, it is preferable to utilize a data store such as Postgres or MySQL, however saving individual rules as rows in a database destroys any relationships between the rules, for example rules B and C depend on the result of rule A.

The present disclosure allows rules to be stored and distributed in a data store by introducing a template to maintain the relational dependencies. To facilitate the inclusion or exclusion of various rules a mapping table is introduced to allow an administrator to enable/disable individual rules.

The individual rules can be stored as rows in a data store as strings, variables within the rule are replaced by tokens that are replaced at runtime based on the data in a mapping table.

The template can include:

Preamble: Any definitions and configuration required to support the security engine and rule set.

Rule place holders: A set of tags one for each rule that replaced at runtime with data from the data in the data store.

Dependency tags: tags that define dependencies and ordering are held in the template allowing constructs such as the example above to be maintained.

Mapping table: This table holds any variable definitions and rule inclusion/exclusion information.

At runtime when the security configuration file is created, a process takes a copy of the template and filters the template based on the mapping table, this removes any rule tags where the administrator has disabled specific rules, next the process replaces the tags in the template with the actual rule data from the data store, finally the process replaces any remaining tags with data from the mapping table. The end result being a complete configuration file ready for the security engine to use.

Here is an example template file:

```
# Preamble
SecRuleEngine On
SecRequestBodyAccess On
# Rule place holders
SecMarker "START_OF_CONFIG_RULES"
"id:900100"
"id:900200"
"id:900210"
"id:900220"
"id:900300"
SecMarker "END_OF_CONFIG_RULES"
# Mapping table
SecMarker
"START_OF_ADMIN_ENABLED_PREDEFINED_RULES"
# This rule checks to see if DOS rules are enabled, if not skip all 912xxx
rules
SecRule &TX:dos_enabled "@eq 0" \
    "id:912100,\
    phase:1,\
    pass,\
    skipAfter:END-DOS-PROTECTION-CHECKS"
"id:912100"
"id:912200"
"id:912300"
SecMarker "END-DOS-PROTECTION-CHECKS"
"id:913100"
"id:913200"
"id:913300"
"id:913400"
SecMarker "END_OF_ADMIN_ENABLED_PREDEFINED_RULES"
```

The {"id:xxxxxx"} tags are rule tags and filled in at runtime by searching the rules table in the database for the rule number and substituting the tag for the rule text.

The rule table can include several columns, and the three main columns are "rule_id", "rule_text" and "enabled," where rule_id is a unique identifier of the rule, rule_text defines the rules, and enabled determines whether the rule is enabled. An admin can enable/disable specific rules by setting the enabled bit via the UI for each rule or collection of rules.

At startup or whenever the configuration changes in the database, a trigger is generated that takes a copy of the template and for each rule ID looks up the rule in the database, if the enabled flag is set, it substitutes the rule tag with the rule text, if the enabled flag is not set the code simply removes the tag from the template. The other fields in the rule table are to make parsing easier and not key to this disclosure.

The template can contain any instructions or dependencies needed to create a fully working configuration, in the example above rule 912100 includes details to show an example of the syntax needed for an implementation, however the template could contain any language or format, the key is being able to manage the rules individually whilst maintaining any dependencies between the individual or groups of rules. For example, &TX:dos_enabled is a dependency tag example that checks to see if DOS (Denial of Service) rules are enabled, if not skip all 912xxx rules.

In an embodiment, we have also used the template to order groups of rules, e.g., customer defined rules come first, then pre-defined rules, then OWASP top 10 rules, etc.

Rule and Dependency Process

FIG. 31 is a process 800 for maintaining dependencies in a set of rules for security scanning. The process 800 can be implemented as a computer-implemented method having steps, via a node 150, via a server 200, as instructions stored in a non-transitory readable-medium for the steps, etc.

The process 800 includes receiving a copy of a template file of security rules where the template file includes a plurality of rule tags and one or more dependency tags that define relationships and dependencies between any rules associated with the plurality of rule tags (step 802).

Next, the process 800 includes scanning the template file including, for each respective rule tag of the plurality of rule tags, checking if an enabled flag is set for the respective rule tag, when the enable flag is set, looking up a respective rule in a rule database and replacing the respective rule tag with the respective rule, and when the enable flag is not set, removing the respective rule tag from the template file (step 804).

Third, the process 800 includes providing an output file including a plurality of rules having the relationships and dependencies, where the output file is used for security scanning (step 806).

The process 800 can further include updating any of the rules in the rule database independently from updating the one or more dependency tags in the template file (step 808). The process 800 can further include repeating the scanning and the providing subsequent to the updating (step 808).

The rules can be stored in the rule database as strings. The rule database can utilize one of Postgres or MySQL.

The output file can define functionality for any of cloud-based Web Application Firewalls (WAF), Deep Packet Inspection (DPI), Intrusion Prevention Systems (IPS), Cloud-based web application and API protection (WAAP), and Data Loss Prevention. The plurality of rules can include detection of any of top ten OWASP web application security risks. The plurality of rules can include anomaly detection, bot detection, Application Programming Interface (API) inspection rules, Denial of Service (DoS) detection rules, and customizable rules.

The process 800 can further include updating the plurality of rules based on monitoring of other users in a cloud-based system. The plurality of rules can include a combination of user-defined rules and pre-defined rules.

Threat Research

Various organizations include security research teams that are involved with determining signatures for zero-day vulnerabilities. An example includes ThreatLabZ from Zscaler. Advantageously, these researchers are able to determine signatures as new threats evolve. Many of these signatures are desired by customers for protecting their private applications behind the connector 400.

One example of such signatures includes Microsoft Exchange attacks such as a server-side request forgery (SSRF) vulnerability in Exchange which allows the attacker to send arbitrary HTTP requests and authenticate as the Exchange server (CVE-2021-26855). There were 8 WAAP signatures that successfully block in-the-wild exploit attempts for the 3 CVEs (Common Vulnerabilities and Exposure) that are related to the Exchange attacks.

Not all customers have dedicated teams of security specialists to write effective signatures to protect against recent common exploits. Customers are also averse to the risk of testing and operationalizing such a change in production environment.

Figure 33:
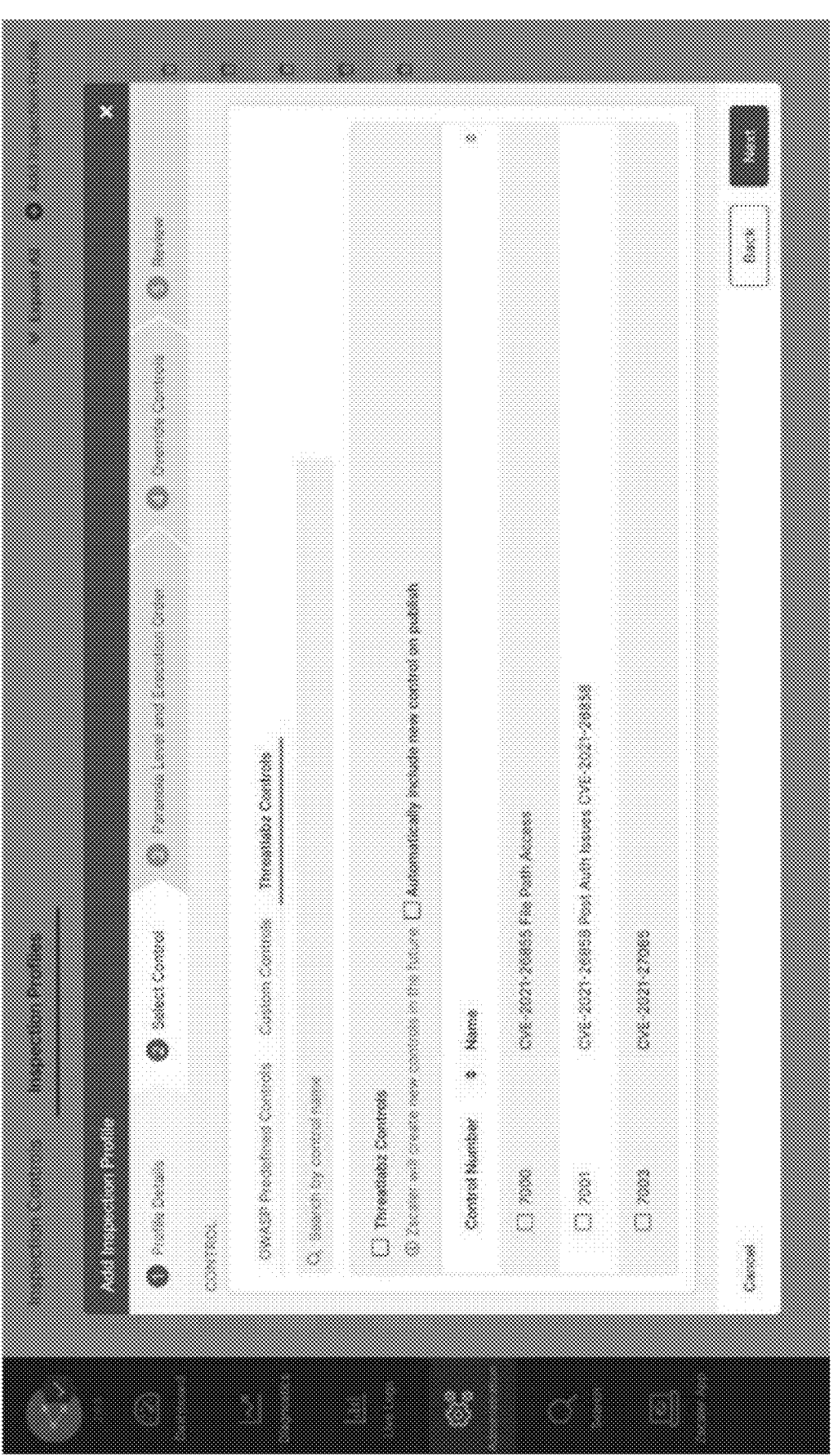
FIG. 33 is a user interface of automatic coverage for newly discovered CVEs.

Of note, there are two types of CVEs—
1) New, where the behavior is still under active monitoring
2) Confirmed CVEs from the past The present disclosure includes fuzzy-logic based signature writing, distribution and controlled opt-in deployment framework to mitigate risks of new CVEs in customer environments. Predefined repository of controls are deployed to mitigate the risk of exploiting confirmed CVEs in customer environment—similar to OWASP-10 but focused on Past-Confirmed-CVEs. Both approaches are seen as "virtual inline patch" to detect and avoid exploitation of vulnerabilities. FIG. 33 is a user interface of automatic coverage for newly discovered CVEs.

Predefined Signatures for Inspecting Private Application Access.

FIG. 32 is a process 850 for predefined signatures for inspecting private application access. The process 850 can be implemented as a computer-implemented method having steps, via a node 150, via a server 200, as instructions stored in a non-transitory readable-medium for the steps, etc.

The process 850 includes, responsive to security research identifying a zero-day Common Vulnerabilities and Exposure (CVE), receiving the associated signatures of the zero-day CVE (step 852); responsive to determining a user can access an application via a cloud-based system, wherein the application is in one of a public cloud, a private cloud, and an enterprise network, and wherein the user is remote over the Internet, obtaining an inspection profile for the user with the inspection profile including a plurality of rules (step 854); performing inspection of transactions after the access using the plurality of rules including a rule for identifying the zero-day CVE (step 856); and, responsive to results of any of the plurality of rules, one or more of monitoring, allowing, blocking, and redirecting the access, via the cloud-based system (step 858).

The plurality of rules can include detection of any of top ten OWASP web application security risks. The plurality of rules can include anomaly detection, bot detection, Application Programming Interface (API) inspection rules, Denial of Service (DoS) detection rules, and customizable rules.

The process 850 can further include updating the plurality of rules based on monitoring of other users in the cloud-based system. The plurality of rules can be stored in a database with relational dependencies maintained therebetween, and wherein upon a violation of a first rule in an order, the access is blocked based thereon. The process 850 can further include, responsive to determining the user cannot access the application via the cloud-based system, notifying the user the application does not exist. The process 850 can further include after the determining, stitching connections together between 1) the user and the cloud-based system and 2) the cloud-based system and the application. The process 850 can further include logging results of the rules and the access in the cloud-based system.

Zero Trust Private Application Access for Government Applications

With more and more government services moving to the Internet, the number of citizens accessing services online has increased dramatically. With many organizations adopting work from home policies, and COVID-19 pushing people to spend less time in public places, government agencies have felt an increased demand to provide online services. Studies show that 77% of citizens surveyed would use more government services if they were accessible from the Internet. At the same time, a minority of government agencies say they have the capabilities to deliver their services from the Internet in a secure and effective manner.

One of the challenges many agencies face with online services is aging applications that are becoming increasingly more vulnerable to attack due to reliance on legacy software that is no longer being patched. Public agencies are under increasing pressure to find ways to provide secure access to government services on the Internet, while maintaining ease of access for citizens. The present approach is built on the zero trust access security architecture disclosed herein, which provides secure, fast, and seamless access to public services.

Figure 34:
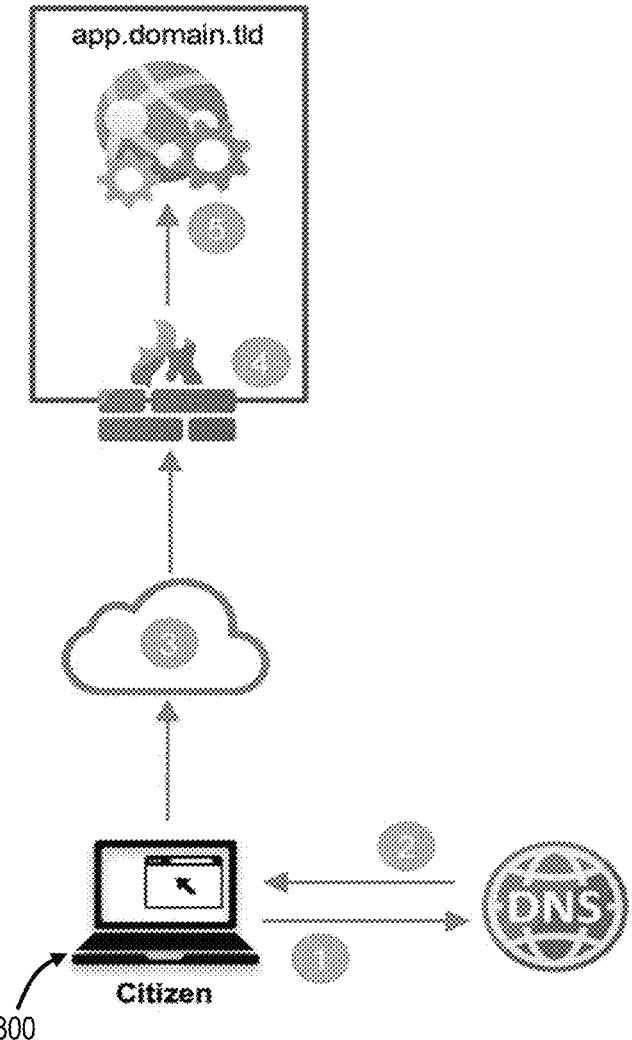
FIG. 34 is a flow diagram of traditional user access to government services.

FIG. 34 is a flow diagram of traditional user access to government services. Traditionally, users (citizens) access government services via a user device 300 by typing a URL into a web browser. The data flow of this scenario is shown in FIG. 34. The citizen (client) opens a web browser and sends a request for "app.domain.tld". DNS resolves the URL to the public IP address of the firewall protecting the web application. The user is routed over the Internet to the firewall protecting the application. The firewall allows connection to the server hosting the application on port 80 or 443. Finally, the user is connected directly to the server or application via TCP/TLS.

There are inherent security risks with this approach, as citizens are connected directly to the web application over the internet. The firewalls protecting the application provide attack surfaces for bad actors, and vulnerabilities in firewall or applications can be exploited. Furthermore, because these firewalls and the applications they protect are "listening" for connection requests from the internet, they are subject to DDoS and brute force attacks. If an attacker were able to successfully breach the firewall, they could move throughout the network laterally to discover, and possibly exploit, other resources in an agency's network.

Various government agencies have taken a first step to addressing these challenges by adopting some concepts of a "Zero Trust Architecture". Zero trust states, among other things, that no user should have access to any resource, without first being authenticated. When citizens are authenticated prior to gaining access to services, agencies gain significant visibility and control over application access. As a result, many agencies have adopted identity programs that allow citizens to authenticate via social media platforms (Instagram, Google, LinkedIn, etc.) as well as using Multi Factor Authentication (MFA). This eliminates the need for agencies to manage login credentials for all citizens, while still providing the ability to manage access.

Such steps are valuable in a journey to zero trust, but still leave some gaps. Even after authentication, an agency's firewalls, applications, and services are still visible to the internet, and bad actors can still discover and attempt to compromise those components. Firewalls and applications are still vulnerable to attacks such as DDoS, web server exploits, and brute force attacks. If a bad actor is able to compromise a firewall or an application, they can still move laterally within an agency's network and cause additional harm.

Zero Trust Citizen Access (ZTCA), the zero trust private application access for government applications disclosed herein, provides a complete zero trust architecture for government agencies by not only requiring user authentication for every citizen, but also removing firewall and application attack surfaces by "hiding" web applications, including legacy apps, from the internet, making them undiscoverable to potential attackers. ZTCA is built on other services disclosed herein, which provides secure, fast, and seamless access to public services for users everywhere.

Various embodiments of the systems and methods disclosed herein work as follows. In contrast to the traditional approach discussed prior, users do not establish direct connections to firewalls, web servers, or applications. Users are connected only to the cloud once they are authenticated. The cloud, such as the cloud-based system disclosed herein, validates access policy for that user and leverages application connectors to connect that user to their requested application.

Application connectors sit in front of applications and allow them to communicate with the cloud, but not the public Internet. This means that applications are not visible or discoverable from the internet, and because they can't be seen, they can't be attacked. Application connectors effectively remove the attack surface from the process.

When a user successfully authenticates, services proxy the connection between the user and the application connector, i.e., it "stitches" the connections together temporarily, for only the duration of the web session. This means the application is only accessible to authorized users (citizens) who have authenticated to the cloud. This approach also allows for a number of other measures to be taken that provide mitigation against a wide range of network-based attacks. The process is illustrated in FIG. 35.

Figure 35:
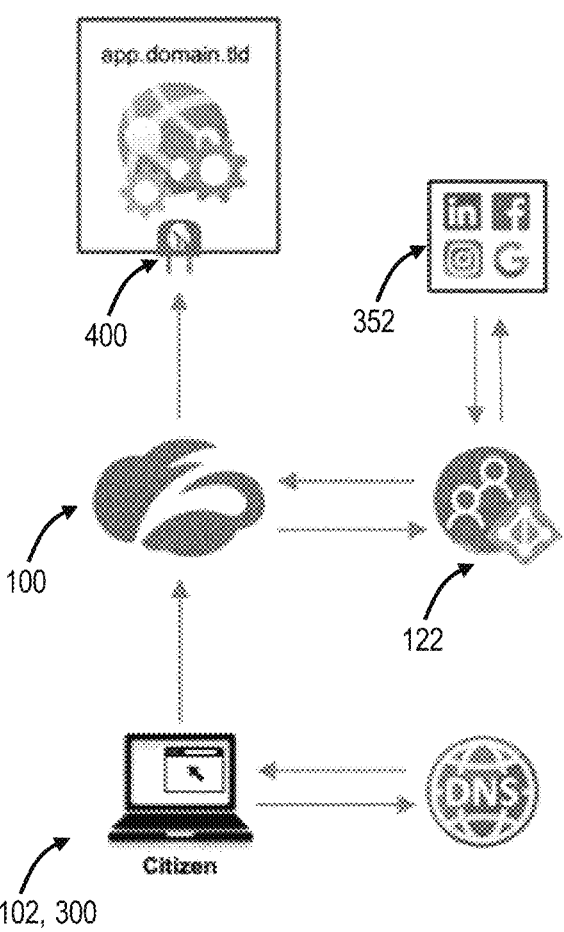
FIG. 35 is a flow diagram of private application access to government applications.

FIG. 35 is a flow diagram of private application access to government applications. When a user (citizen) 102 opens a web browser via a user device 300 and sends a request for an application (for example, app.domain.tld), DNS directs the request to the cloud-based system 100. Systems forward a Security Assertion Markup Language (SAML) request to a configured IDP 122, where the IDP 122 determines if the user 102 passes the authentication requirements. If the user 102 passes, it presents the user 102 with a login page, consisting of a choice of social media services 352 that have been configured for authentication. The user 102 provides credentials, and the IDP 122 validates the credentials with the social media service 352. Responsive to the credentials being valid, the social media service 352 returns an authorization to the IDP 122. The IDP 122 returns a SAML assertion to the cloud-based system 100, validating that authentication is successful. The cloud-based system 100 then evaluates access policies for the user and initiates the connection between the user and the requested application via the app connector 400.

It will be appreciated that the present systems and methods can be utilized for providing access to any application. The various embodiments referencing government applications disclosed herein shall be construed as a non-limiting examples.

Present systems and methods support integration with multiple IDP vendors to authenticate users via social media logins, login.gov, or ID.me. The provisioning process is flexible and is dependent on the level of identity proofing and level of assurance required for access to applications. A framework agencies can adopt is FISMA, NIST, RMF, and NIST SP 900-63 for end user identity requirements. In the case of a higher assurance level requirements, systems and methods are able to offload user access to a remote browser isolation container that allows users to access content without the ability to download or inject data to applications.

The concept of Zero Trust Citizen Access (ZTCA) is to establish an adaptive identity-based access control system between the citizens and web-hosted government services. The key capabilities of ZTCA architecture revolve around identity-based schema, secure application access, continuous trust evaluation, and an elevated citizen experience that scales dynamically. ZTCA is a capability in ZPA that has been designed specifically to provide citizens with simple, secure and highly scalable access to any public web or legacy applications. Citizens simply open their favorite web browser and securely access public services from any device. ZPA continues to enforce zero trust policies for existing applications by default. ZTCA leverages application segmentation, a key facet of ZPA that creates a segment of one between a named citizen and a named application. It means that citizens are never brought on the network and the application is never exposed to the public internet. Public agencies can rely on ZTCA to deliver real-time visibility into citizen activity, identify citizens who access applications via browsers, eliminate the public attack surface, reduce the risk of lateral movement all while greatly increasing the scalability of their services.

While leveraging third party or social media account credentials can make it easier for users to access protected applications, many organizations choose to leverage additional measures during the authentication process that can reduce the risk of stolen or compromised credentials. Various embodiments include contextual access policies and multi-factor authentication, which are two methods that any organization can consider when choosing authentication policies. Various embodiments include geo or network location, endpoint device posture, social network, and MFA.

Geo or network location provides the ability to allow, deny, or limit access based on geographic location or by known IP ranges. For example, as a condition of access, the agency could deploy a policy that only allows access from within a particular country, state, or even from within the agency's network itself. Endpoint device posture provides the ability to allow, deny, or limit access based on certain criteria of the endpoint. For example, if the citizen's device is a member of the agency's domain, or if there is an antivirus program running. Social network allows agencies to limit authentication to only specific social networks, for example, only allowing LinkedIn. Multi Factor Authentication (MFA) validates a citizen's identity with a second form of authentication such as a soft token, one-time code, push notification to a cell phone, biometric device, and others of the like.

Figure 36:
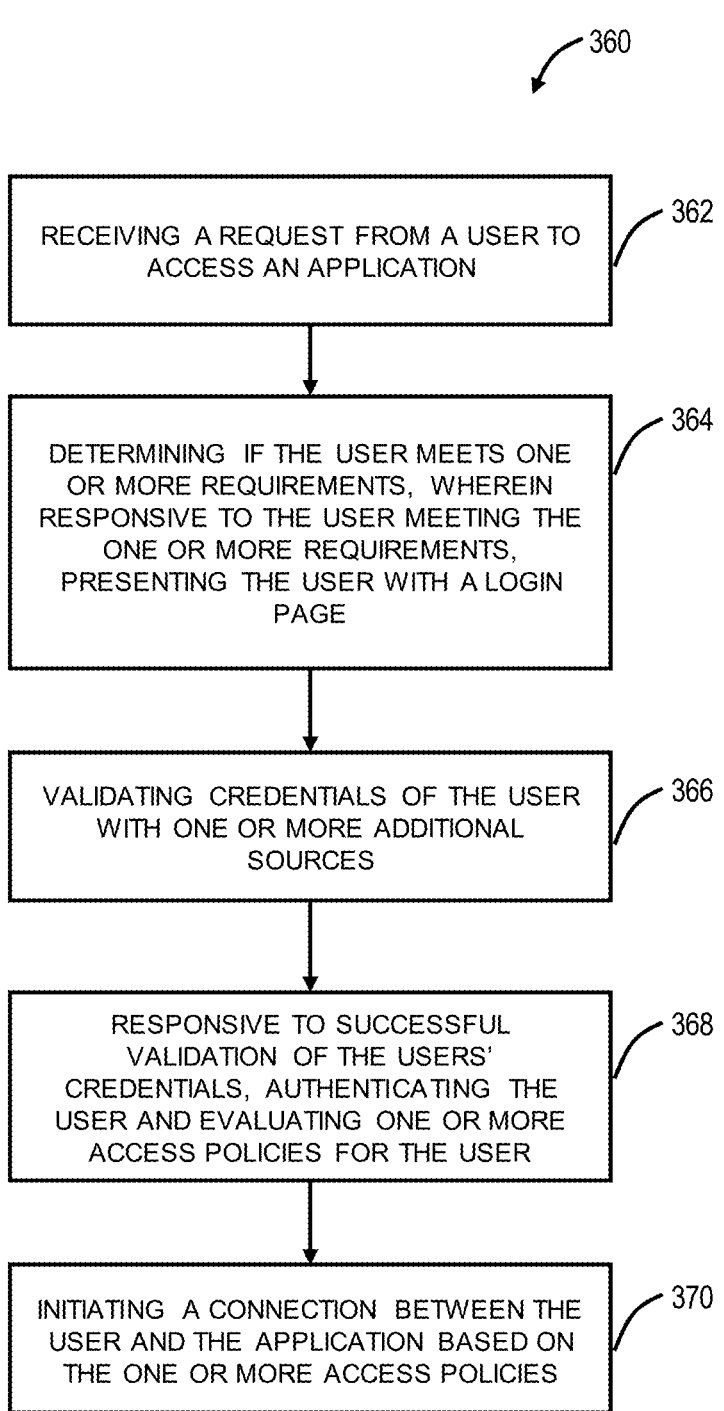
FIG. 36 is a flow diagram of a process for providing zero trust private application access for government applications.

FIG. 36 is a flow diagram of a process 360 for providing zero trust private application access for government applications. The process 360 can be implemented as a computer-implemented method having steps, via a node 150, via a server 200, as instructions stored in a non-transitory readable-medium for the steps, etc. The process 360 includes receiving a request from a user to access an application (step 362), determining if the user meets one or more requirements, wherein responsive to the user meeting the one or more requirements, presenting the user with a login page (step 364), validating credentials of the user with one or more additional sources (step 366), responsive to successful validation of the users' credentials, authenticating the user and evaluating one or more access policies for the user (step 368), and initiating a connection between the user and the application based on the one or more access policies (step 370).

The process 360 can further include the connection between the user and the application being via an application connector. The login page can include a choice of social media services that have been configured for authentication.

The one or more additional sources can include a social media service chosen from the one or more social media services, and the validating can include validating the users' credentials with the social media service. Responsive to receiving the request, the steps can include forwarding a Security Assertion Markup Language (SAML) request to a configured Identity Provider (IDP), wherein the determining, validating, and authenticating are performed by the IDP, and receiving validation from the IDP indicating that the authentication is successful. The authenticating can further include utilizing one or more of contextual access policies, and Multi-factor Authentication (MFA) in order to authenticate a user. The contextual access policies can include geo-location, network location, endpoint device posture, and social network, and the MFA can include soft tokens, one-time codes, push notifications, and utilization of biometric devices. The application can be a government application.

The one or more requirements can include authentication requirements such as policy associated with the specific user. The additional sources can include the social media services as described in previous sections of the disclosure and/or any other service that can provide validation of credentials for the proposed methods.

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc., described herein can be used in any and all combinations with each other.

What is claimed is:

1. A method for providing zero trust private application access for applications comprising:

receiving, at a cloud-based system, a request from a user to access an application;

determining, by the cloud-based system, whether the user meets one or more authentication or contextual requirements;

responsive to the user meeting the one or more requirements, presenting, by the cloud-based system, the user with a login page that is hosted by the cloud-based system and not by the application;

validating credentials of the user with one or more additional identity sources including at least one federated identity provider configured by an administrator;

responsive to successful validation of the users' credentials, authenticating the user and evaluating, at the cloud-based system, one or more access policies for the user; and initiating, by the cloud-based system, a per-session connection between the user and an application connector associated with the application, the application connector being configured to establish only outbound connections to the cloud-based system such that the application is not exposed to inbound connections, wherein the user is not placed on a network containing the application, and the application remains undiscoverable from the Internet, and a path between the user and the application is stitched only for a duration of an authorized session.

2. The method of claim 1, wherein the connection between the user and the application is via an application connector instantiated within a protected network environment, the application connector configured to initiate an outbound connection to the cloud-based system to enable access to the application without exposing the application to inbound connections, and wherein the application connector rejects all unsolicited inbound traffic and is not addressable from outside the protected network environment.

3. The method of claim 1, wherein the login page presented to the user includes selectable authentication options corresponding to a plurality of identity providers configured by an administrator, and wherein the identity providers include one or more public or private authentication sources, including at least one identity provider that is not reachable from the network containing the application.

4. The method of claim 3, wherein the one or more additional sources include a social media service chosen from the one or more social media services, and wherein the validating includes validating the users' credentials with the social media service.

5. The method of claim 4, further comprising:

responsive to receiving the request, forwarding a Security Assertion Markup Language (SAML) request to a configured Identity Provider (IDP), wherein the determining, validating, and authenticating are performed by the IDP; and receiving validation from the IDP indicating that the authentication is successful.

6. The method of claim 1, wherein the authenticating further includes utilizing one or more of contextual access policies, and Multi-factor Authentication (MFA) in order to authenticate a user, wherein the contextual access policies are evaluated by the cloud-based system rather than by the application or the protected network environment.

7. The method of claim 6, wherein the contextual access policies include geo-location, network location, endpoint device posture, and social network, and wherein MFA includes soft tokens, one-time codes, push notifications, and utilization of biometric devices.

8. The method of claim 1, wherein the application is a government application configured for access by a citizen, and wherein access to the government application requires an assurance level defined by a government-mandated digital identity framework.

9. A non-transitory computer-readable medium comprising instructions that, when executed, cause one or more processors to perform steps of:

receiving, at a cloud-based system, a request from a user to access an application;

determining, by the cloud-based system, whether the user meets one or more authentication or contextual requirements;

responsive to the user meeting the one or more requirements, presenting, by the cloud-based system, the user with a login page that is hosted by the cloud-based system and not by the application;

validating credentials of the user with one or more additional identity sources including at least one federated identity provider configured by an administrator;

responsive to successful validation of the users' credentials, authenticating the user and evaluating, at the cloud-based system, one or more access policies for the user; and initiating, by the cloud-based system, a per-session connection between the user and an application connector associated with the application, the application connector being configured to establish only outbound connections to the cloud-based system such that the application is not exposed to inbound connections, wherein the user is not placed on a network containing the application, and the application remains undiscoverable from the Internet, and a path between the user and the application is stitched only for a duration of an authorized session.

10. The non-transitory computer-readable medium of claim 9, wherein the connection between the user and the application is via an application connector instantiated within a protected network environment, the application connector configured to initiate an outbound connection to the cloud-based system to enable access to the application without exposing the application to inbound connections, and wherein the application connector rejects all unsolicited inbound traffic and is not addressable from outside the protected network environment.

11. The non-transitory computer-readable medium of claim 9, wherein the login page presented to the user includes selectable authentication options corresponding to a plurality of identity providers configured by an administrator, and wherein the identity providers include one or more public or private authentication sources, including at least one identity provider that is not reachable from the network containing the application.

12. The non-transitory computer-readable medium of claim 11, wherein the one or more additional sources include a social media service chosen from the one or more social media services, and wherein the validating includes validating the users' credentials with the social media service.

13. The non-transitory computer-readable medium of claim 12, wherein the instructions further cause the one or more processors to perform steps of:

responsive to receiving the request, forwarding a Security Assertion Markup Language (SAML) request to a configured Identity Provider (IDP), wherein the determining, validating, and authenticating are performed by the IDP; and receiving validation from the IDP indicating that the authentication is successful.

14. The non-transitory computer-readable medium of claim 9, wherein the authenticating further includes utilizing one or more of contextual access policies, and Multi-factor Authentication (MFA) in order to authenticate a user, wherein the contextual access policies are evaluated by the cloud-based system rather than by the application or the protected network environment.

15. The non-transitory computer-readable medium of claim 14, wherein the contextual access policies include geo-location, network location, endpoint device posture, and social network, and wherein MFA includes soft tokens, one-time codes, push notifications, and utilization of biometric devices.

16. The non-transitory computer-readable medium of claim 9, wherein the application is a government application, and wherein access to the government application requires an assurance level defined by a government-mandated digital identity framework.

17. A cloud-based system comprising:

a plurality of nodes each having at least one processor and memory comprising instructions that, when executed, cause the at least one processor to:

receive, at the cloud-based system, a request from a user to access an application;

determine, by the cloud-based system, whether the user meets one or more authentication or contextual requirements;

responsive to the user meeting the one or more requirements, presenting, by the cloud-based system, the user with a login page that is hosted by the cloud-based system and not by the application;

validate credentials of the user with one or more additional identity sources including at least one federated identity provider configured by an administrator;

responsive to successful validation of the users' credentials, authenticate the user and evaluate, at the cloud-based system, one or more access policies for the user; and initiating, by the cloud-based system, a der-session connection between the user and an application connector associated with the application, the application connector being configured to establish only outbound connections to the cloud-based system such that the application is not exposed to inbound connections, wherein the user is not placed on a network containing the application, and the application remains undiscoverable from the Internet, and a path between the user and the application is stitched only for a duration of an authorized session.

18. The cloud-based system of claim 17, wherein the connection between the user and the application is via an application connector instantiated within a protected network environment, the application connector configured to initiate an outbound connection to the cloud-based system to enable access to the application without exposing the application to inbound connections, and wherein the application connector rejects all unsolicited inbound traffic and is not addressable from outside the protected network environment.

19. The cloud-based system of claim 17, wherein the authenticating further includes utilizing one or more of contextual access policies, and Multi-factor Authentication (MFA) in order to authenticate a user, wherein the contextual access policies are evaluated by the cloud-based system rather than by the application or the protected network environment.

20. The cloud-based system of claim 19, wherein the contextual access policies include geo-location, network location, endpoint device posture, and social network, and wherein MFA includes soft tokens, one-time codes, push notifications, and utilization of biometric devices.

\*   \*   \*   \*   \*